US008724862B2

(12) United States Patent
Minagawa et al.

(10) Patent No.: US 8,724,862 B2
(45) Date of Patent: May 13, 2014

(54) IMAGE PROCESSING APPARATUS, IMAGE PROCESSING METHOD, AND NON-TRANSITORY COMPUTER READABLE STORAGE MEDIUM

(75) Inventors: Akihiro Minagawa, Kawasaki (JP); Yutaka Katsuyama, Kawasaki (JP); Nobuyuki Hara, Kawasaki (JP); Yoshinobu Hotta, Kawasaki (JP); Wei Fan, Beijing (CN)

(73) Assignee: Fujitsu Limited, Kawasaki (JP)

( * ) Notice: Subject to any disclaimer, the term of this patent is extended or adjusted under 35 U.S.C. 154(b) by 306 days.

(21) Appl. No.: 13/406,835

(22) Filed: Feb. 28, 2012

(65) Prior Publication Data
US 2012/0257803 A1 Oct. 11, 2012

(30) Foreign Application Priority Data
Apr. 6, 2011 (JP) .................................. 2011-084346

(51) Int. Cl.
*G06K 9/00* (2006.01)
(52) U.S. Cl.
USPC ........................................................ 382/124
(58) Field of Classification Search
None
See application file for complete search history.

(56) References Cited

U.S. PATENT DOCUMENTS

2012/0019562 A1* 1/2012 Park et al. ..................... 345/657
2013/0335349 A1* 12/2013 Ferren et al. .................. 345/173

FOREIGN PATENT DOCUMENTS

| EP | 478442 A1 * | 4/1992 |
| JP | 03-195908 | 8/1991 |
| JP | 2003-331268 | 11/2003 |
| JP | 2003-346162 | 12/2003 |

* cited by examiner

*Primary Examiner* — Vikkram Bali
(74) *Attorney, Agent, or Firm* — Fujitsu Patent Center

(57) ABSTRACT

An image processing apparatus includes a central-portion extracting unit, a classifying unit and a determining unit. The central-portion extracting unit extracts edges from an image area and extracts a plurality of central portions of areas each of which is sandwiched between the edges. The classifying unit groups the central portions by classifying adjacent central portions that have no edge therebetween into a single group. The determining unit determines an area of finger, the area of finger being surrounded by the central portions classified into a group by the classifying unit and peripheral edges of the central portion, the area of finger being an area where a ratio of a luminance gradient in a short side direction to a luminance gradient in a long side direction is within a predetermined threshold.

13 Claims, 22 Drawing Sheets

| 14 | 12 | 10 |
| --- | --- | --- |
| M(2, 1) 12 | ■ | |
| M(2, 2) | | |

FIG.6

| | | |
| --- | --- | --- |
| | ■ | 12  M(2, 2) / M(2, 3) |
| 14 | 12 | 10 |

M(3, 1)   M(3, 2)   M(3, 3)

| PSEUDO SKELETON NUMBER | COORDINATES | MAP VALUE (val) |
|---|---|---|
| 0 | Px(0)=100, Py(0)=100 | val=13 |
| 1 | Px(1)=99, Py(1)=99 | val=14 |
| ... | ... | ... |

| CLASS NUMBER | PSEUDO SKELETON NUMBER | COORDINATES | MAP VALUE (val) |
|---|---|---|---|
| Pc=0 | 0 | Px(0)=100, Py(0)=100 | val=13 |
|  | 1 | Px(1)=99, Py(1)=99 | val=14 |
|  | ... | ... | ... |
| Pc=1 | 21 | Px(21)=30, Py(21)=100 | val=15 |
|  | 23 | Px(23)=30, Py(23)=101 | val=12 |
|  | ... | ... | ... |

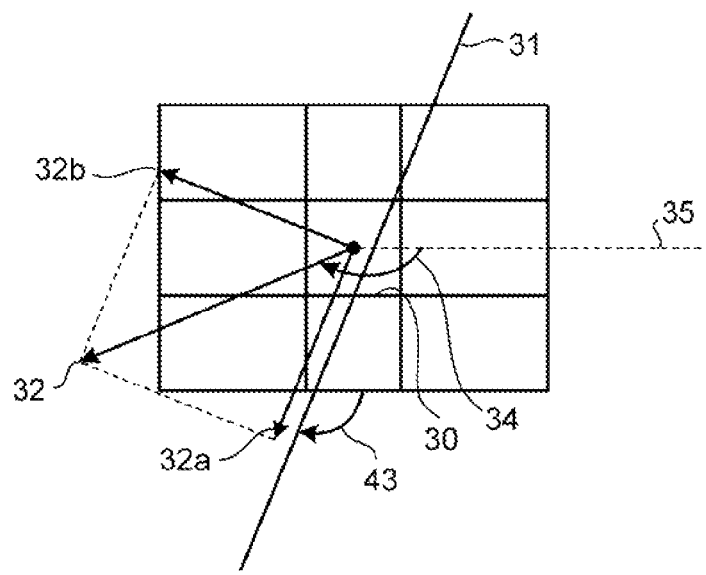

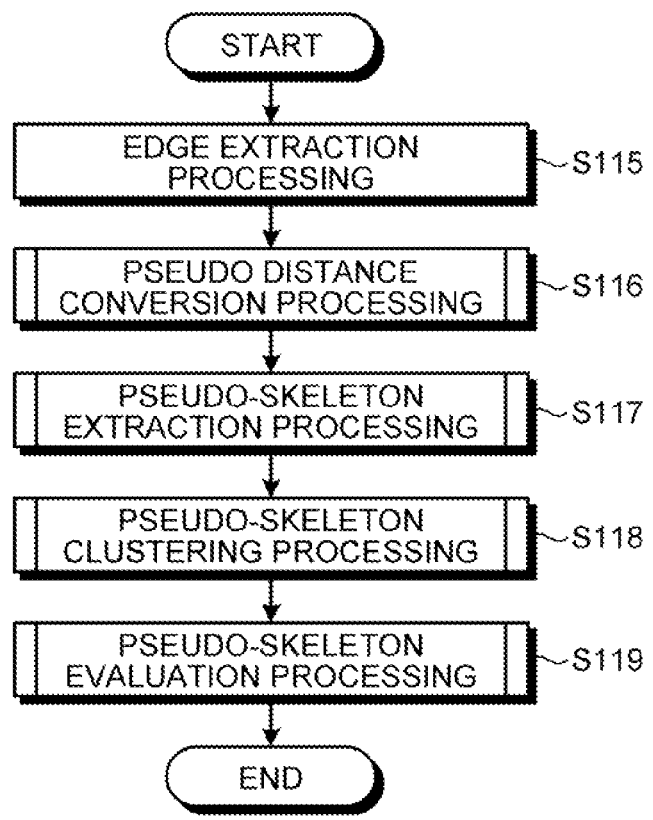

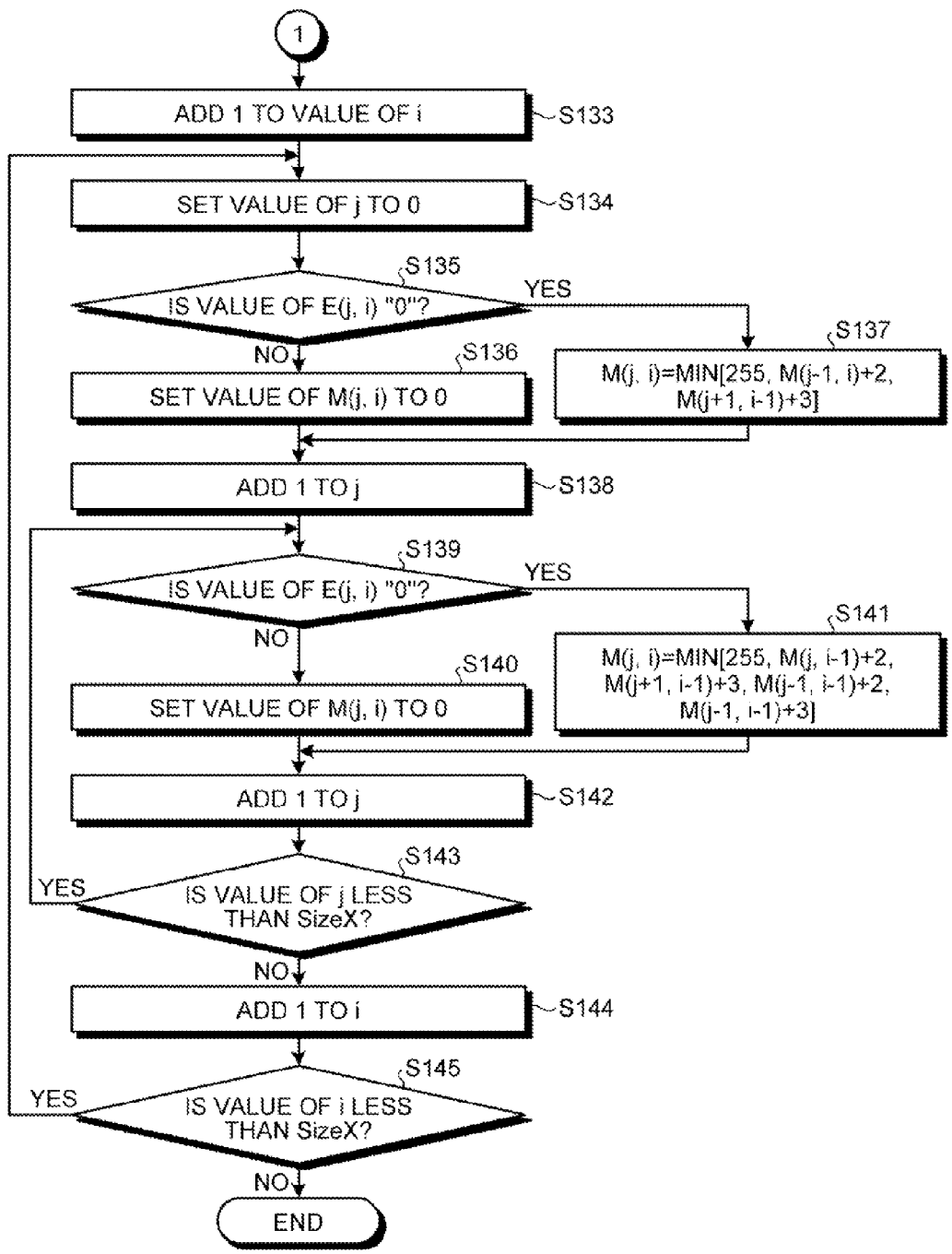

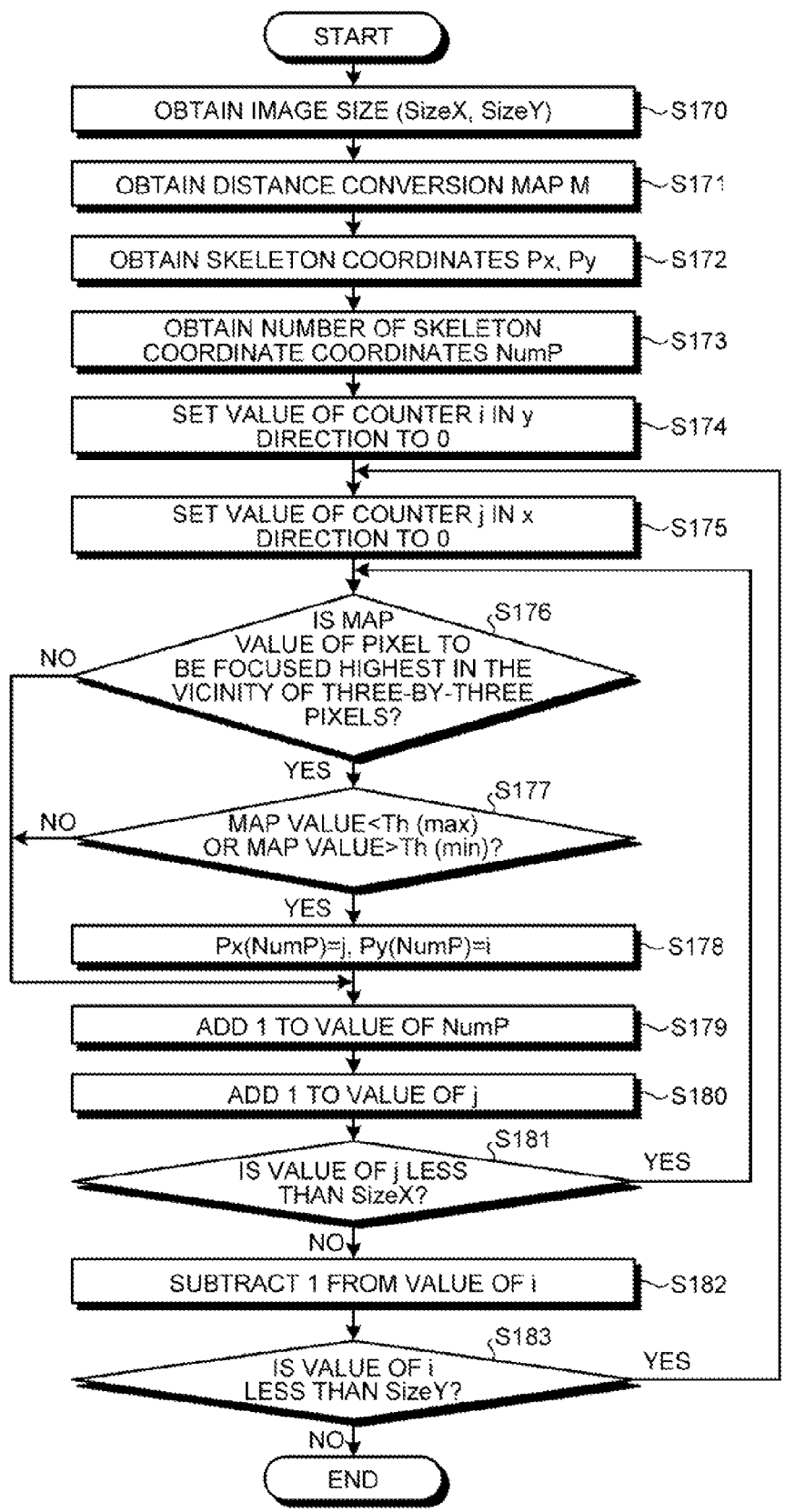

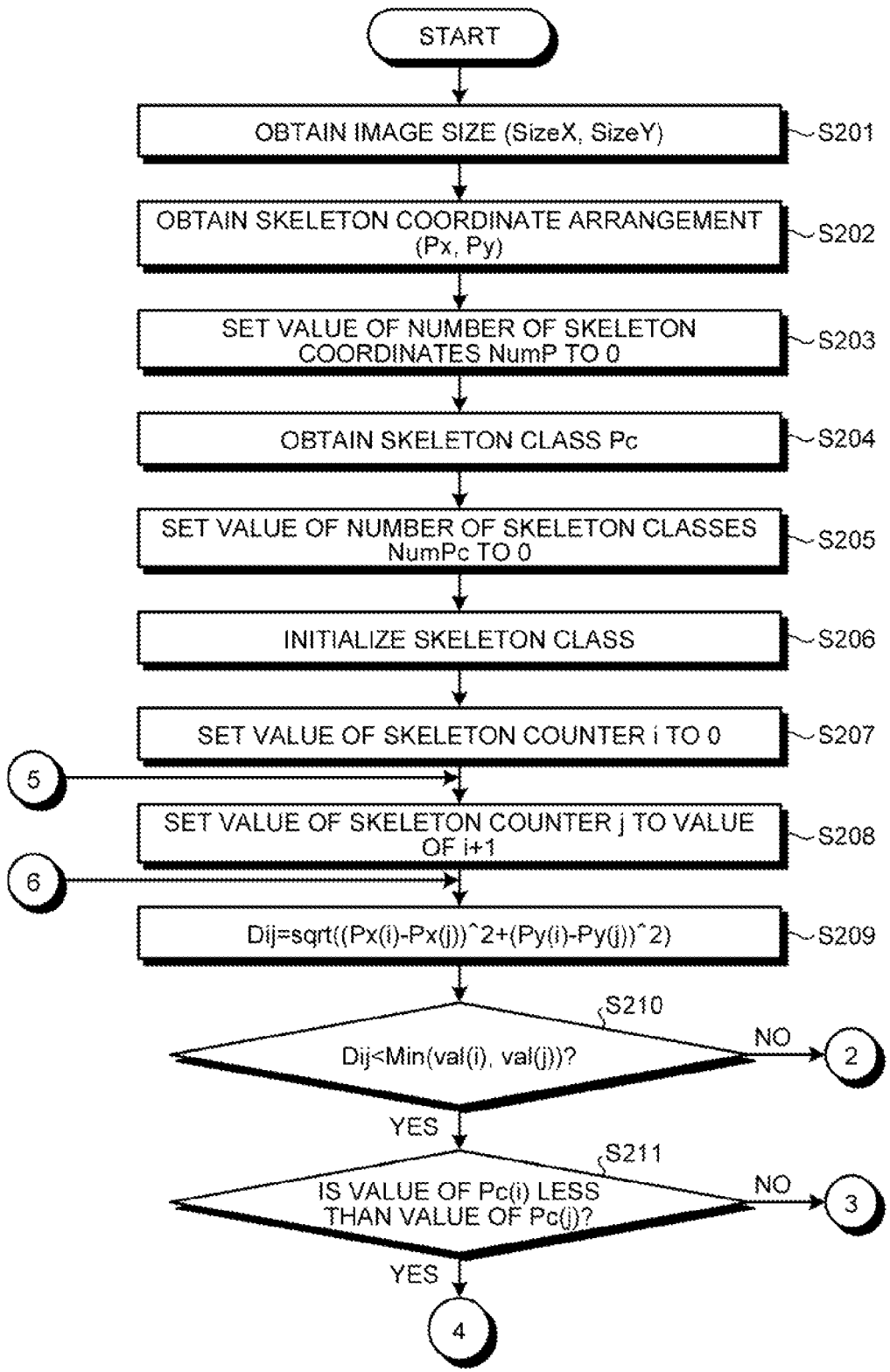

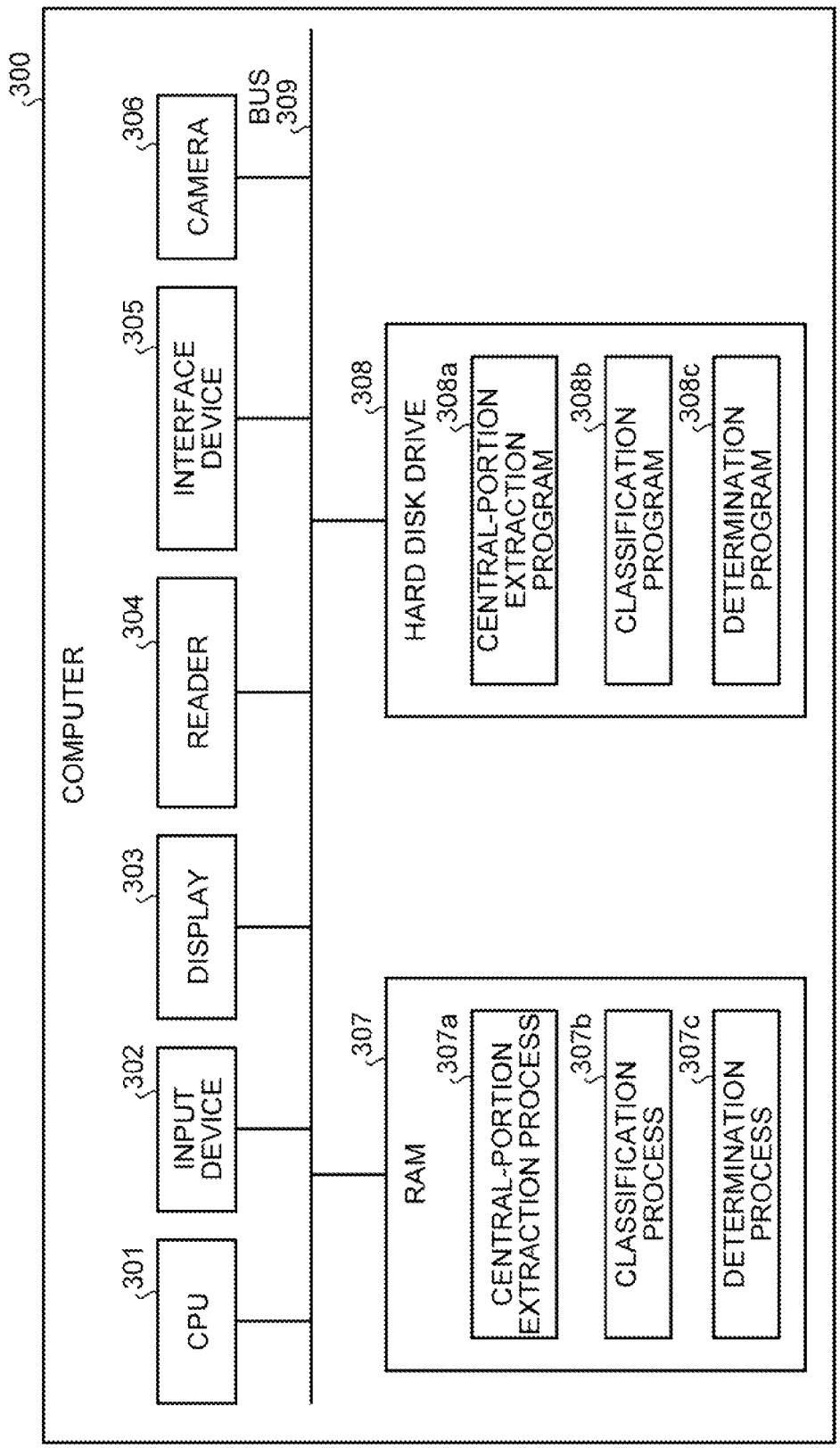

IMAGE PROCESSING APPARATUS, IMAGE PROCESSING METHOD, AND NON-TRANSITORY COMPUTER READABLE STORAGE MEDIUM

CROSS-REFERENCE TO RELATED APPLICATION

This application is based upon and claims the benefit of priority of the prior Japanese Patent Application No. 2011-084346, filed on Apr. 6, 2011, the entire contents of which are incorporated herein by reference.

FIELD

The embodiment discussed herein is directed to an image processing apparatus, for example.

BACKGROUND

There has been proposed a conventional technique for photographing a hand of a user, determining the movements of the hand or fingers, and performing processing corresponding to the movements of the hand or the fingers. For example, see Japanese Laid-open Patent Publication No. 2003-346162. In this conventional technique, to determine the movements of the hand or the fingers of the user, an area of the fingers of the hand in an image is determined by using the condition that the hand and the fingers have skin color.

However, the above-mentioned conventional technique has a drawback in that it fails to extract the area of the fingers of the hand.

In the above-mentioned conventional technique, the area of the fingers of the hand is determined by using the condition that the hand has the skin color. However, when a background having a similar color to the color of the fingers overlaps with the fingers of the hand, it is impossible to determine the area of the fingers of the hand by their color. For example, in a state that a finger of the hand of the user overlaps with the face of the user, it is impossible to determine the area of the finger.

SUMMARY

According to an aspect of an embodiment of the invention, an image processing apparatus includes a central-portion extracting unit that extracts edges from an image area and extracts a plurality of central portions of areas each of which is sandwiched between the edges; a classifying unit that groups the central portions by classifying adjacent central portions that have no edge therebetween into a single group; and a determining unit that determines an area of finger, the area of finger being surrounded by the central portions classified into a group by the classifying unit and peripheral edges of the central portion, the area of finger being an area where a ratio of a luminance gradient in a short side direction to a luminance gradient in a long side direction is within a predetermined threshold.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is an explanatory drawing for explaining forward processing;

FIG. 6 is an explanatory drawing for explaining backward processing;

FIG. 13 is a drawing illustrating relationship between a luminance gradient Gf in the direction of the finger and a luminance gradient Gn in the circumferential direction;

FIG. 14 is an explanatory drawing for explaining a00, a01, a10, and a11;

FIG. 17 is a flowchart illustrating the processing procedure of extraction processing by the pseudo skeleton;

FIG. 18B is a second flowchart illustrating the processing procedure of the forward processing;

FIG. 20 is a flowchart illustrating the processing procedure of pseudo-skeleton extraction processing;

FIG. 21A is a first flowchart illustrating the processing procedure of pseudo-skeleton clustering processing;

FIG. 24 is a diagram illustrating a hardware configuration of a computer that constitutes the image processing apparatus according to the embodiment.

DESCRIPTION OF EMBODIMENT

A preferred embodiment of the present invention will be explained with reference to accompanying drawings.

The present invention is not limited to this embodiment.

Figure 1:
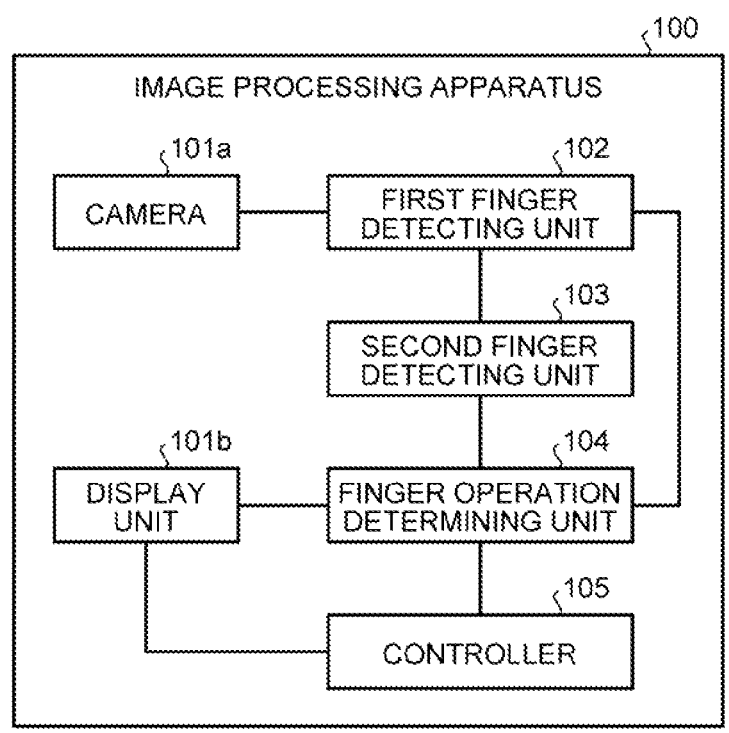
FIG. 1 is a functional block diagram illustrating a constitution of an image processing apparatus according to an embodiment.

The constitution of the image processing apparatus according to the present embodiment is explained. FIG. 1 is a functional block diagram illustrating the constitution of the image processing apparatus according to the present embodiment. As illustrated in FIG. 1, this image processing apparatus 100 includes a camera 101a, a display unit 101b, a first finger detecting unit 102, a second finger detecting unit 103, a finger operation determining unit 104, and a controller 105.

The camera 101a takes an image within a photographing range and outputs photographed image data to the first finger detecting unit 102. The display unit 101b is a display device such as a display that displays various kinds of information.

The first finger detecting unit 102 is a processing unit that detects a finger included in the image based on color. For example, the first finger detecting unit 102 extracts a skin-color area from the image data and notifies the finger operation determining unit 104 of the extracted area as an area of the finger.

The finger to be extracted is in a certain zone as viewed from the camera placed at the position apart from the finger by a specific distance, and the angle of view of the camera is measured in advance, whereby the range of the size of the finger to be extracted is specified. Furthermore, the following explanation is premised on the case that the inside of the finger faces the camera in a directly opposed manner or faces the camera in an approximately opposed manner.

When it is impossible to detect the finger based on the color, the first finger detecting unit 102 outputs the image data to the second finger detecting unit 103 so as to request the detection of the finger. For example, the first finger detecting unit 102 determines that, when the number of pixels in the skin color area of the image data is less than a first number of pixels or larger than a second number of pixels, it is impossible to detect the finger. The number of the first pixels and the number of the second pixels are predetermined values. In the processing for detecting the finger by the first finger detecting unit 102, for example, the technique disclosed in Japanese Laid-open Patent Publication No. 2003-346162 may be used to detect the finger.

The second finger detecting unit 103 is a processing unit that extracts edges from the image data, obtains a pseudo skeleton corresponding to a central portion of the area surrounded by the edges, and makes use of luminance gradients of the pseudo skeleton and the area surrounded by the edges to detect the finger. The second finger detecting unit 103 outputs a detection result of the finger to the finger operation determining unit 104.

The finger operation determining unit 104 is a processing unit that determines a user's instruction based on the detection result of the finger. The finger operation determining unit 104 outputs the instruction to the controller 105. The controller 105 controls, for example, the display unit 101b or the sound volume of a speaker not illustrated based on the instruction.

Figure 2:
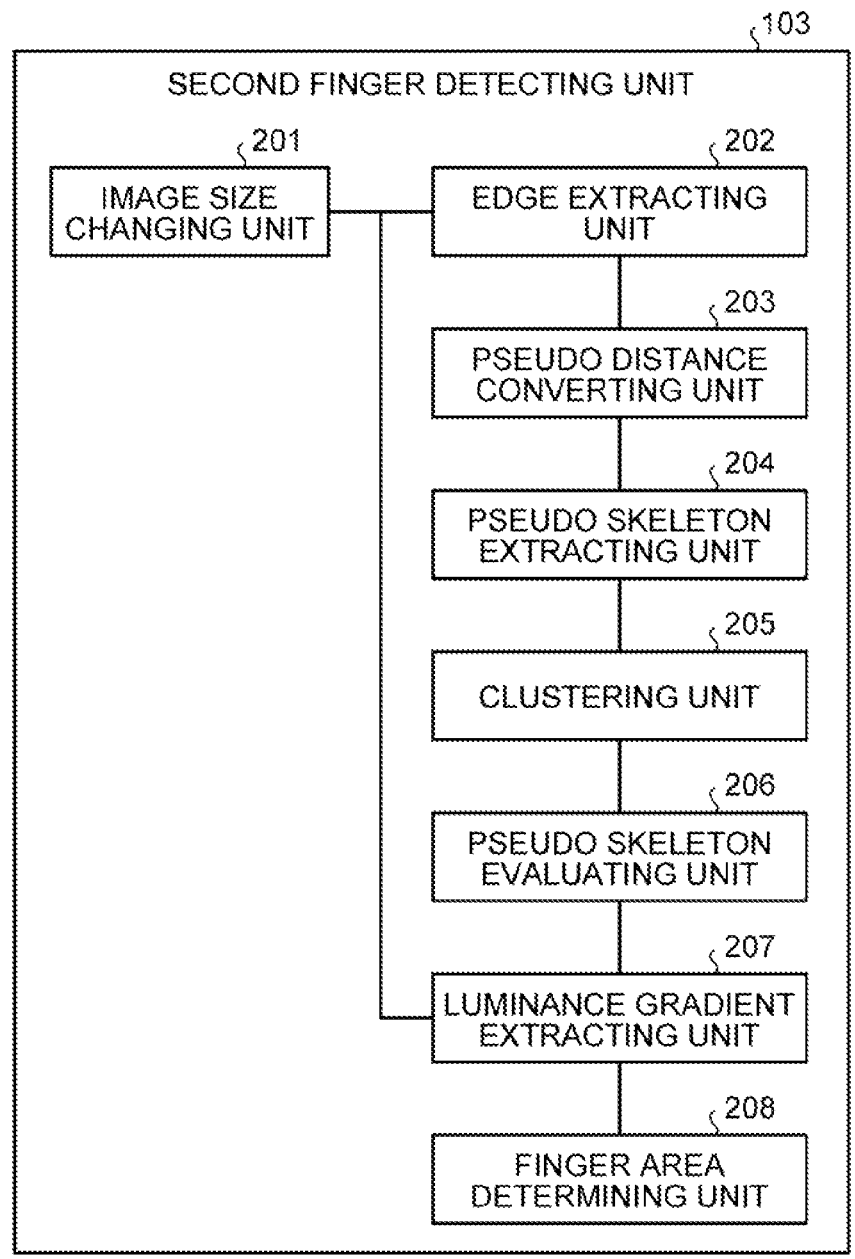
FIG. 2 is a functional block diagram illustrating a constitution of a second finger detecting unit.

Next, the constitution of the second finger detecting unit 103 illustrated in FIG. 1 is explained. FIG. 2 is a functional block diagram illustrating the constitution of the second finger detecting unit. As illustrated in FIG. 2, the second finger detecting unit 103 includes an image size changing unit 201, an edge extracting unit 202, a pseudo distance converting unit 203, a pseudo skeleton extracting unit 204, and a clustering unit 205. Furthermore, the second finger detecting unit 103 has a pseudo skeleton evaluating unit 206, a luminance gradient extracting unit 207, and a finger area determining unit 208.

The edge extracting unit 202, the pseudo distance converting unit 203, and the pseudo skeleton extracting unit 204 are examples of central area extracting units. The clustering unit 205 is an example of a classifying unit. The luminance gradient extracting unit 207 and the finger area determining unit 208 are examples of determining units.

The image size changing unit 201 changes a parameter SizeX on the width of the image and a parameter SizeY on the height of the image, thus adjusting the size of the image and outputting the image data whose size is adjusted to the edge extracting unit 202 and the luminance gradient extracting unit 207. For example, the image size changing unit 201 sequentially outputs original image data, image data reduced into ½, and image data reduced into ¼ to the edge extracting unit 202 and the luminance gradient extracting unit 207.

Figure 3:
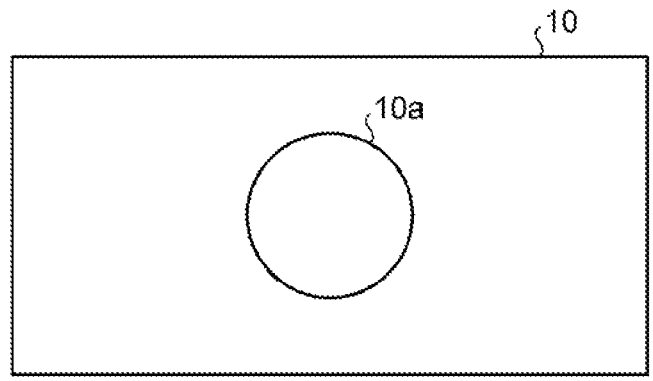
FIG. 3 is a drawing illustrating one example of an edge image.

The edge extracting unit 202 is a processing unit that extracts the edges from the image data. Here, an image formed by extracting the edges from the image data is referred to as an "edge image". The edge extracting unit 202 detects, for example, the edges from the image data by making use of Hough transformation or differential edge detection, for example. The edge extracting unit 202 outputs the edge image to the pseudo distance converting unit 203. FIG. 3 is a drawing illustrating one example of the edge image. As illustrated in FIG. 3, this edge image 10 includes an edge 10a.

The pseudo distance converting unit 203 is a processing unit that measures a distance to each pixel from the edge closest to the pixel in the edge image. The pseudo distance converting unit 203 divides the edge image into maps of M(j, i) and gives a map value to each map M(j, i) depending on the distance from the edge. One map corresponds to a pixel.

Figure 4:
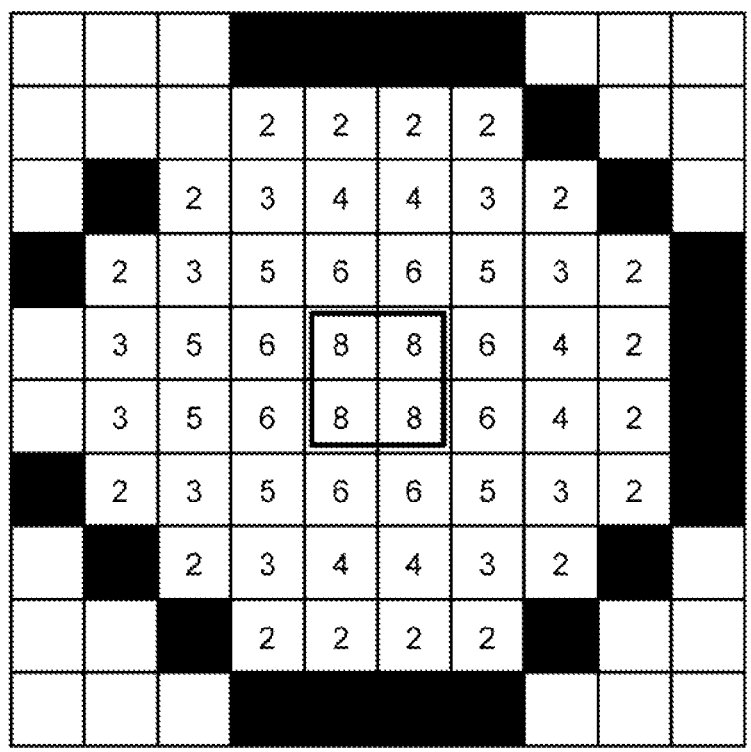
FIG. 4 is an explanatory drawing for explaining relationship between the edge image and map values.

FIG. 4 is an explanatory drawing for explaining relationship between the edge image and map values. In FIG. 4, a black pixel corresponds to an edge pixel, and a white pixel corresponds to a non-edge pixel. As illustrated in FIG. 4, the pseudo distance converting unit 203 gives a small map value to a map M(j, i) close to the edge and gives a large map value to a map M(j, i) distant from the edge. The pseudo distance converting unit 203 gives the map value "zero (0)" to a map M(j, i) corresponding to the edge.

The specific processing of the pseudo distance converting unit 203 is explained. The pseudo distance converting unit 203 performs forward processing and backward processing, thus giving a map value to each map M(j, i).

The forward processing is explained. In the forward processing, the pseudo distance converting unit 203 laterally scans from the upper left to the lower right of the edge image to perform the following processing sequentially. FIG. 5 is an explanatory drawing for explaining the forward processing. In the forward processing, the pseudo distance converting unit 203 selects a map M(j, i) to determine whether the selected map M(j, i) is an edge pixel or a non-edge pixel. The pseudo distance converting unit 203 sets, when the map(j, i) is an edge pixel, the map value of the map(j, i) to zero (0) and selects the next map.

When the selected map M(j, i) is a non-edge pixel, the pseudo distance converting unit 203 obtains a value by adding two (2) to the map value of a map arranged in the directly upper position of the selected map M(j, i) and a value by adding three (3) to the map value of a map arranged in the upper right position of the map M(j, i). Furthermore, the pseudo distance converting unit 203 obtains a value by adding three (3) to the map value of a map arranged in the upper left position of the selected map M(j, i) and a value by adding two (2) to the map value of a map arranged in the directly left position of the map M(j, i). Thereafter, the pseudo distance converting unit 203 sets the map value of the selected map M(j, i) to the minimum value out of the obtained values.

In the example illustrated in FIG. 5, the pseudo distance converting unit 203 has selected a map M(2, 2). A value obtained by adding two (2) to the map value of the map M(1, 2) arranged in the directly upper position of the map M(2, 2) is 12, and a value obtained by adding three (3) to the map value of the map M(1, 3) arranged in the right upper position of the map M(2, 2) is 10. Furthermore, a value obtained by adding three (3) to the map value of the map M(1, 1) arranged in the left upper position of the map M(2, 2) is 14, and a value obtained by adding two (2) to the map value of the map M(2, 1) arranged in the directly left position of the map M(2, 2) is 12. In this case, the pseudo distance converting unit 203 sets the map value of the map M(2, 2) to 10.

Next, the backward processing is explained. In the backward processing, the pseudo distance converting unit 203 laterally scans from the lower right to the upper left of the edge image to perform the following processing sequentially. FIG. 6 is an explanatory drawing for explaining the backward processing. In the backward processing, the pseudo distance converting unit 203 selects a map M(j, i) to determine whether the selected map is an edge pixel or a non-edge pixel. The pseudo distance converting unit 203 sets, when the map M(j, i) is an edge pixel, the map value of the map M(j, i) to zero (0) and selects the next map.

When the selected map M(j, i) is a non-edge pixel, the pseudo distance converting unit 203 obtains a value by adding two (2) to the map value of a map arranged in the directly lower position of the selected map M(j, i) and a value by adding three (3) to the map value of a map arranged in the lower right position of the map M(j, i). Furthermore, the pseudo distance converting unit 203 obtains a value by adding three (3) to the map value of a map arranged in the lower left position of the selected map M(j, i) and a value by adding two (2) to the map value of a map arranged in the directly right position of the map M(j, i). Thereafter, the pseudo distance converting unit 203 sets the map value of the selected map M(j, i) to the minimum value out of the obtained values.

In the example illustrated in FIG. 6, the pseudo distance converting unit 203 has selected a map M(2, 2). A value obtained by adding two (2) to the map value of the map M(3, 2) arranged in the directly lower position of the map M(2, 2) is 12, and a value obtained by adding three (3) to the map value of the map M(3, 3) arranged in the right lower position of the map M(2, 2) is 10. Furthermore, a value obtained by adding three (3) to the map value of the map M(3, 1) arranged in the left lower position of the map M(2, 2) is 14, and a value obtained by adding two (2) to the map value of the map M(2, 3) arranged in the directly right position of the map M(2, 2) is 12. In this case, the pseudo distance converting unit 203 sets the map value of the map M(2, 2) to 10.

As described above, the pseudo distance converting unit 203 performs the forward processing and the backward processing, thus giving the map value to each map M(j, i). The data obtained by giving the map value to each map M(j, i) is referred to as "pseudo distance conversion map". The pseudo distance converting unit 203 outputs the pseudo distance conversion map to a pseudo skeleton extracting unit 204.

Figures 7, 8:
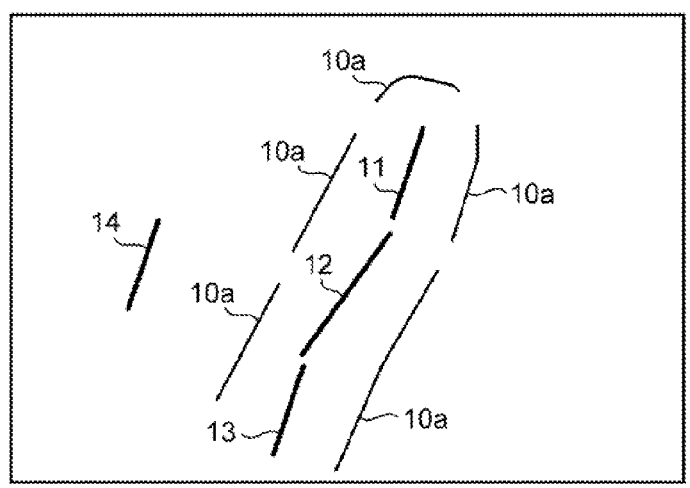
FIG. 7 is a drawing illustrating one example of a pseudo skeleton.
FIG. 8 is a drawing illustrating one example of a data structure in pseudo-skeleton extraction data.

The pseudo skeleton extracting unit 204 is a processing unit that extracts a pseudo skeleton corresponding to a central portion of an area surrounded by the edges based on the pseudo distance conversion map. The processing such that the pseudo skeleton extracting unit 204 extracts the pseudo skeleton corresponds to processing such that a central portion of an area that includes the center of the finger is detected. FIG. 7 is a drawing illustrating one example of the pseudo skeleton. In FIG. 7, each of lines 10a illustrates the edge. Each of lines 11 to 14 corresponds to the pseudo skeleton.

The pseudo skeleton extracting unit 204 selects a pixel to be focused from the pseudo distance conversion map and determine whether or not the map value of the selected pixel to be focused is maximum in the vicinity of an area in which the pixels are arranged in a three-by-three-matrix pattern. When the map value of the pixel to be focused is maximum in the vicinity of an area in which the pixels are arranged in a three-by-three-matrix pattern, the pseudo skeleton extracting unit 204 determines whether or not the corresponding pixel is the pseudo skeleton by comparing thresholds.

The finger to be extracted is limited to a finger that is in the specific range of the distance from the camera. In that case, the size of the finger is within a certain range. The size of the typical finger is defined in advance. The maximum size of the finger photographed in an image is referred to as "threshold Th(max)", and the minimum size of the finger photographed in an image is referred to as "threshold Th(min)".

When the relationship between the above-mentioned thresholds Th(max) and Th(min) is expressed by equation "Th(max)>Th(min)*4", the image itself is shrunk thus avoiding fluctuations in width of the skeleton itself. For example, when Th(max)=Th(min)*4, Th(max) is set to Th(min)*3 at first and the following processing is performed thus extracting only the size of the finger distributed over the three-fourth range on the thinner side in the range of the size of the finger. When a series of processes are completed, the image size is reduced to half by a process at S52 illustrated in FIG. 16B described later.

Here, since the size of the image is reduced to half, the size of the finger is also reduced to half. Simultaneously, Th(max) is halved and Th(min) is set to Th(min)*1.5. In this manner, it is possible to extract the finger corresponding to the three-fourth range on the thicker side in the range of the size of the finger. Here, in this case, the image is reduced thus reducing the number of pixels to be processed.

For example, the pseudo skeleton extracting unit 204 determines that, when the map value of the pixel to be focused is smaller than the threshold Th(max) and larger than the threshold Th(min), the corresponding pixel to be focused is a pixel corresponding to the pseudo skeleton. Here, the values of the threshold Th(max) and the threshold Th(min) are set in advance. Furthermore, in the pseudo skeleton extracting unit 204, the operation to select the pixel to be focused is equivalent to the operation to select the above-mentioned map M(j, i).

The pseudo skeleton extracting unit 204 performs the above-mentioned processing to generate pseudo-skeleton extraction data. FIG. 8 is a drawing illustrating one example of a data structure in the pseudo-skeleton extraction data. As illustrated in FIG. 8, the pseudo-skeleton extraction data stores a pseudo skeleton number, a coordinate, and a map value that are corresponding to each other. For example, in the pseudo skeleton having a pseudo skeleton number of "zero (0)", the x coordinate is 100, the y coordinate is 100, and the map value is 13. The pseudo skeleton extracting unit 204 outputs the pseudo skeleton extraction data to a clustering unit 205.

The clustering unit 205 is a processing unit that clusters the pixels corresponding to the pseudo skeletons based on the pseudo skeleton extraction data. The pixel corresponding to the pseudo skeleton is referred to as "pseudo skeleton pixel". The clustering unit 205 selects two pseudo skeleton pixels different to each other and classifies, when no edge exists between the pseudo skeleton pixels, these pseudo skeleton pixels into a single group.

The processing of the clustering unit 205 is specifically explained. The map value of the pseudo skeleton pixel illustrates a distance from the edge closest thereto. Therefore, when equation (1) is established, there exists no edge between the respective pseudo skeleton pixels. In equation (1), Dab illustrates Euclidean distance between the pseudo skeleton pixel a and the pseudo skeleton pixel b. Furthermore, val(a) and val(b) correspond to the map value of the pseudo skeleton pixel and the map value of the pseudo skeleton pixel b respectively.

$$Dab<Min(val(a)/2,val(b)/2) \tag{1}$$

In equation (1), a meaning of dividing the map value by two (2) is that the map value converted in the pseudo distance converting unit 203 corresponds to a distance that is twice the Euclidean distance.

Figures 9, 10:
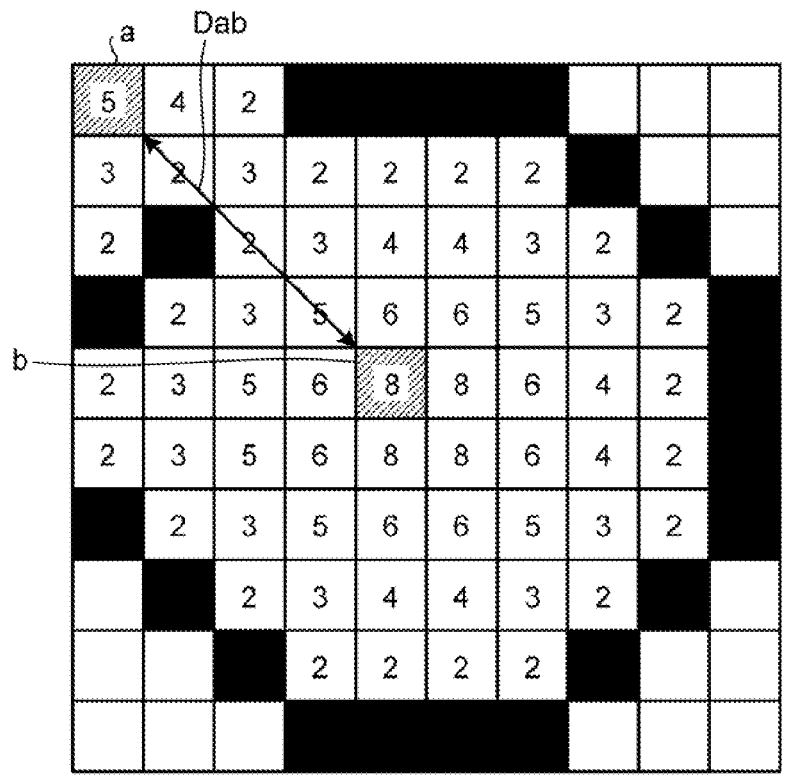
FIG. 9 is an explanatory drawing for explaining processing of a clustering unit.
FIG. 10 is a drawing illustrating one example of a data structure in classified skeleton data.

FIG. 9 is an explanatory drawing for explaining processing in the clustering unit. In FIG. 9, "a" is the pseudo skeleton pixel a, and "b" is the pseudo skeleton pixel b. Then, val(a) is five (5), and val(b) is eight (8). Furthermore, Dab is four (4). In this case, the condition of equation (1) is not satisfied and hence, the clustering unit 205 classifies the pseudo skeleton pixel a and the pseudo skeleton pixel b into different classes.

The clustering unit 205 classifies the respective pseudo skeleton pixels by making use of equation (1) thus generating classified skeleton data. FIG. 10 is a drawing illustrating one example of a data structure in the classified skeleton data. As illustrated in FIG. 10, the classified skeleton data stores a class number, a pseudo skeleton number, a coordinate, and a map value that correspond to each other. In the example illustrated in FIG. 10, the data of the class number Pc "0" includes the pseudo skeleton pixels having the skeleton numbers "0" and "1" respectively. The clustering unit 205 outputs the classified skeleton data to a pseudo skeleton evaluating unit 206.

The pseudo skeleton evaluating unit 206 is a processing unit that evaluates the pseudo skeleton pixel classified into the same class and determines whether or not each of the pseudo skeleton pixels is a candidate of the finger. The pseudo skeleton evaluating unit 206 evaluates the pseudo skeleton pixels classified into the same class based on a length and linearity.

The processing of the pseudo skeleton evaluating unit 206 that evaluates the pseudo skeleton pixels classified into a class i based on the length is explained. The pseudo skeleton evaluating unit 206 calculates the distance between the coordinates of an upper end and a lower end of the pseudo skeleton pixel belonging to the class i as the length. The pseudo skeleton evaluating unit 206 determines that, when the length is smaller than Th(Len max) and, at the same time, larger than Th(Len min), the pseudo skeleton pixel belonging to the class i is the candidate of the finger. The values of Th(Len max) and Th(Len min) are specified in advance. Here, the length is determined depending on the map value (width of finger) of the detected skeleton. Here, in this case, the inside of the finger to be extracted faces the camera in a directly opposed manner or faces the camera in an approximately opposed manner. In this case, assuming that the finger has the length of a fixed multiple of the width of the finger, a margin with respect to the length of the finger determined by the fixed multiple of the width of the finger is adjusted thus determining Th(Len max) and Th(Len min).

After the evaluation based on the length, the pseudo skeleton evaluating unit 206 measures the linearity of the finger-candidate pseudo skeleton pixel belonging to the class i and reevaluates whether or not the pseudo skeleton pixel is the candidate of the finger. The pseudo skeleton evaluating unit 206 obtains, when normal vectors of a straight line are expressed by (Vx, Vy) and an any point on the straight line is expressed by (Cx, Cy), the straight-line parameters (Vx, Vy) and (Cx, Cy) as the linearity. The straight line is expressed by the following equation (2). Here, the normal vectors of the straight line is expressed by (Vx, Vy), and the any point on the straight line is expressed by (Cx, Cy).

$$Vx(x-Cx)+Vy(y-Cy)=0 \tag{2}$$

The processing of the pseudo skeleton evaluating unit 206 that obtains linearities Vx, Vy, Cx, and Cy is explained. First of all, the pseudo skeleton evaluating unit 206 obtains VX' and Vy' such that an evaluation function of the straight line expressed by equation (3) is minimized. The evaluation function of the straight line is expressed by equation (4). In equation (4), symbol j expresses an index corresponding to the pseudo skeleton number of the pseudo skeleton pixel included in the class i.

$$Vx'+Vy'y+1=0 \tag{3}$$

$$\text{Evaluation function}=\Sigma jVx'(Px(j))+Vy'(Py(j))+1)^2 \tag{4}$$

The pseudo skeleton evaluating unit 206 obtains Vx' and Vy' such that the evaluation function is minimized by calculating equation (5).

$$\begin{bmatrix} Vx' \\ Vy' \end{bmatrix} = \begin{bmatrix} \sum j(Px(j)^{\wedge}2) & \sum j(Px(j)Py(j)) \\ \sum j(Px(j)Py(j)) & \sum j(Py(j)^{\wedge}2) \end{bmatrix}^{-1} \begin{bmatrix} \sum jPx(j) \\ \sum jPy(j) \end{bmatrix} \tag{5}$$

The pseudo skeleton evaluating unit 206 obtains Vx' and Vy' and, thereafter, standardizes Vx' and Vy' so that each of Vx' and Vy' becomes the normal vector thus obtaining Vx and Vy. The pseudo skeleton evaluating unit 206 standardizes Vx' and Vy' so that each of Vx' and Vy' becomes the normal vector based on equation (6) and equation (7). Here, Z included in equation (6) and equation (7) is obtained by equation (8).

$$Vx=Vx'/Z \tag{6}$$

$$Vy=Vy'/Z \tag{7}$$

$$Z=\text{sqrt}(Vx\times Vx+Vy\times Vy) \tag{8}$$

Here, equation (9) is established from the relationship of equation (2) and equation (3). Furthermore, assuming that Cx and Cy are feet of perpendiculars with respect to the lines of Ux and Uy, equation (9) can be expressed by equation (10). Here, Ux and Uy correspond to the coordinates of the uppermost pseudo skeleton pixel out of the pseudo skeleton pixels belonging to the same class. In this embodiment, it is assumed that a fingertip is located on a line extending in the direction of Ux, Uy.

$$VxCx+VyCy=Z \tag{9}$$

$$(Uy-Cy)Vx-(Ux-Cx)Vy \tag{10}$$

In consideration of simultaneous equations of equation (9) and equation (10), Cx and Cy are expressed by equation (11). The pseudo skeleton evaluating unit 206 obtains Cx and Cy by making use of equation (11).

$$\begin{bmatrix} Cx \\ Cy \end{bmatrix} = \begin{bmatrix} Vx & Vy \\ Vy & Vx \end{bmatrix}^{-1} \begin{bmatrix} Z \\ UyVx+UxVy \end{bmatrix} \tag{11}$$

The pseudo skeleton evaluating unit 206 obtains Vx, Vy, Cx, and Cy and, thereafter, obtains the value of evaluation expression J expressed by equation (12).

$$\text{Evaluation expression } J = \Sigma j(Vx(x-Cx)+Vy(y-Cy))^2 \qquad (12)$$

The pseudo skeleton evaluating unit 206 determines that, when the value of the evaluation expression J is less than Th(line), the pseudo skeleton image belonging to the class i is the candidate of the finger. Here, The value of Th(line) is set in advance.

Furthermore, the pseudo skeleton evaluating unit 206 averages the map values of the respective pseudo skeleton images included in the class determined as the candidate of the finger thus calculating the average map value val(ave).

The pseudo skeleton evaluating unit 206 creates class data based on the pseudo skeleton image included in the class determined as the candidate of the finger. The class data includes the length l, the upper position (Ux, Uy), the average map value val(ave), and the straight line parameters (Vx, Vy) and (Cx, Cy). The pseudo skeleton evaluating unit 206 outputs the class data to a luminance gradient extracting unit 207.

The luminance gradient extracting unit 207 is a processing unit that determines the class corresponding to the finger out of the classes determined as the candidates of the fingers based on a luminance gradient in the direction of the finger and the luminance gradient in the direction perpendicular to the direction of the finger. The direction perpendicular to the direction of the finger is referred to as "the circumferential direction of the finger".

Figure 11:
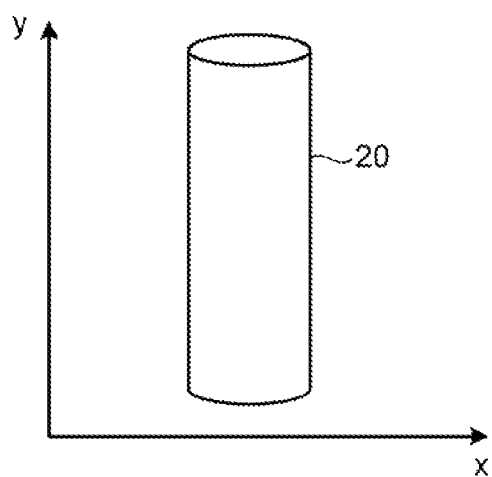
FIG. 11 is an explanatory drawing for explaining characteristics of luminance with respect to a finger.

FIG. 11 is an explanatory drawing for explaining characteristics of luminance with respect to the finger. FIG. 11 illustrates a cylindrical model 20 corresponding to the finger. The cylindrical model 20 has a uniform reflection property. The axis of ordinate y illustrated in FIG. 11 corresponds to the direction of the finger. The axis of abscissa x illustrated in FIG. 11 corresponds to the circumferential direction of the finger. When the finger is irradiated with a light from a parallel light source, there is no change in luminance in the direction of the axis of ordinate y. On the other hand, there exists the luminance gradient in the direction of the axis of abscissa x. The luminance gradient extracting unit 207 determines the class corresponding to the finger by making use of the property of the cylindrical model 20 irradiated with the light from the light source. In the case of a small object such as the finger, it can be considered that an illumination light such as a fluorescent light is substantially the parallel light source.

The processing of the luminance gradient extracting unit 207 is specifically explained. The luminance gradient extracting unit 207 separates the luminance gradient in the direction of the finger and the luminance gradient in the circumferential direction from the image data based on the class data obtained from the pseudo skeleton evaluating unit 206.

It is possible to obtain the circumferential direction by the normal vector V=(Vx, Vy) of the straight line parameter. In the case where the normal vector V is given, it is possible to obtain the direction of the finger (Wx, Wy) by equation (13) and equation (14). The luminance gradient extracting unit 207 calculates, when the value of Vy is below zero (0), the direction of the finger (Wx, Wy) by making use of equation (13). The luminance gradient extracting unit 207 calculates, when the value of Vy exceeds zero (0), the direction of the finger (Wx, Wy) by making use of equation (14).

$$(Wx, Wy) = (Vy, -Vx) \qquad (13)$$

$$(Wx, Wy) = (-Vy, Vx) \qquad (14)$$

The luminance gradient extracting unit 207 calculates the direction of the finger (Wx, Wy) and, thereafter, specifies the area of the finger with respect to the class i. When an any point (x, y) is decomposed in the direction of the finger and in the circumferential direction, the relationship expressed by equation (15) is established.

$$(x, y) = (Cx + d \times Vx + e \times Wx, Cy + d \times Vy + e \times Wy) \qquad (15)$$

Figure 12:
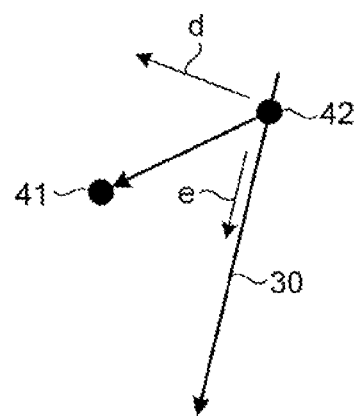
FIG. 12 is an explanatory drawing for explaining d and e.

Equation (15) includes d corresponding to the distance from the center of the finger in the circumferential direction and e corresponding to the distance from the distal end of the finger in the direction of the finger. FIG. 12 is an explanatory drawing for explaining d and e. In FIG. 12, the line 30 corresponds to the normal vector V=(Vx, Vy), the coordinate 41 corresponds to the any coordinate (x, y), and the coordinate 42 corresponds to the coordinate of the distal end of the finger (Cx, Cy).

The luminance gradient extracting unit 207 obtains d and e by equation (16). Here, the luminance gradient extracting unit 207 defines the area of the finger that includes the pixel (x, y) such that the range of d satisfies equation (17) and equation (18) and the range of e satisfies equation (19) and equation (20). Furthermore, the luminance gradient extracting unit 207 defines the above-mentioned area of the finger as the range of searching the luminance gradient.

$$\begin{bmatrix} d \\ e \end{bmatrix} = \begin{bmatrix} Vx & Wx \\ Vy & Wy \end{bmatrix}^{-1} \begin{bmatrix} x - Cx \\ y - Cy \end{bmatrix} \qquad (16)$$

$$d > -\text{val(ave)}/2 \qquad (17)$$

$$d < \text{val(ave)}/2 \qquad (18)$$

$$e > 0 \qquad (19)$$

$$e < 1 \qquad (20)$$

The luminance gradient extracting unit 207 specifies the area of the finger that is defined as the range of searching the luminance gradient and, thereafter, obtains the luminance gradient with respect to each pixel in the range of searching the luminance gradient. Here, the luminance gradient in the direction of the finger is expressed by Gf, and the luminance gradient in the circumferential direction of the finger is expressed by Gn. The luminance gradient extracting unit 207 obtains the luminance gradient Gf in the direction of the finger and the luminance gradient Gn in the circumferential direction by making use of equations (21) and (22). Here, θ in equations (21) and (22) is an angle obtained by equation (23).

$$Gf = G \times \cos(\gamma - \theta) \qquad (21)$$

$$Gn = G \times \sin(\gamma - \theta) \qquad (22)$$

$$\theta = \tan^{-1}(Wy/Wx) \qquad (23)$$

FIG. 13 is a drawing illustrating relationship between the luminance gradient Gf in the direction of the finger and the luminance gradient Gn in the circumferential direction. In FIG. 13, a pixel 30 is the pixel to be focused and the coordinate thereof is (x, y), a line segment 31 is a vector in the direction of the finger and the vector corresponds to (Wx, Wy), a line segment 32 is the luminance gradient of the pixel 30, a line segment 32a corresponds to the luminance gradient Gf in the direction of the finger, a line segment 32b corresponds to the luminance gradient Gn in the circumferential direction of the finger, and an angle 43 corresponds to the above-mentioned θ.

Here, G in equations (21) and (22) corresponds to the magnitude of the luminance gradient of each pixel and corresponds to the line segment 32 illustrated in FIG. 13. Furthermore, γ in equations (21) and (22) corresponds to an angle 34 made by the line segment 32 with respect to a horizontal axis 35. The luminance gradient extracting unit 207 obtains the luminance gradient G by equation (24).

Furthermore, the luminance gradient extracting unit 207 obtains γ by equation (25).

$$G = \mathrm{squrt}(Gv^2 + Gh^2) \qquad (24)$$

$$\gamma = \tan^{-1}(Gv/Gh) \qquad (25)$$

The luminance gradient extracting unit 207 obtains Gv included in equations (24) and (25) by equation (26). Furthermore, The luminance gradient extracting unit 207 obtains Gh included in equations (24) and (25) by equation (27).

$$Cv = (a11 + a10 - a01 - a00) \qquad (26)$$

$$Gh = (a11 + a00 - a10 - a00) \qquad (27)$$

Equations (26) and (27) include a00, a01, a10, and a11 corresponding to luminance values of an upper left pixel, an upper right pixel, a lower left pixel, and a lower right pixel of the pixel to be focused (x, y) respectively. FIG. 14 is an explanatory drawing for explaining a00, a01, a10, and a11. In the case where the pixel to be focused is a pixel 33, a positional relationship between the pixel to be focused and the upper left pixel A00, the upper right pixel A01, the lower left pixel A10, and the lower right pixel A11 is as illustrated in FIG. 14. The pixel values of A00, A01, A10, and A11 are a00, a01, a10, and a11 respectively.

The luminance gradient extracting unit 207 obtains the luminance gradient Gf in the direction of the finger and the luminance gradient Gn in the circumferential direction with respect to the any coordinate (x, y) included in the range of searching the luminance gradient and, thereafter, determines whether or not the condition of equation (28) is satisfied. The luminance gradient extracting unit 207 determines that, when the condition of equation (28) is satisfied, the pixel in the any coordinate is not positioned in the area of the finger. When the condition of equation (28) is not satisfied, the luminance gradient extracting unit 207 determines that the pixel in the any coordinate is positioned in the area of the finger and, thereafter, the luminance gradient extracting unit 207 adds one (1) to the value of Num(fing). The initial value of Num (fing) is set to zero (0).

$$Gf/Gn > Th \qquad (28)$$

The luminance gradient extracting unit 207 determines whether or not all pixels included in the range of searching the finger with respect to the class i satisfy the condition of equation (28), and counts up the value of Num(fing). The luminance gradient extracting unit 207 determines whether or not all pixels included in the range of searching the finger satisfy the condition of equation (28) and, thereafter, determines whether or not the value of Num(fing) is equal to or less than a threshold Th(m).

The luminance gradient extracting unit 207 determines that, when the value of Num(fing) is equal to or less than the threshold Th(m), the class i is a class corresponding to the finger. The luminance gradient extracting unit 207 also performs the above-mentioned processing with respect to the other class obtained from the pseudo skeleton evaluating unit 206, and determines whether or not the other class is a class corresponding to the finger. The luminance gradient extracting unit 207 outputs information of the class corresponding to the finger to a finger area determining unit 208.

The finger area determining unit 208 is a processing unit that determines the area of the finger based on the information of the class obtained from the luminance gradient extracting unit 207. For example, the finger area determining unit 208 defines an area in the range of the pseudo skeleton pixel included in the class as the area of the finger. Furthermore, the finger area determining unit 208 determines a coordinate of the uppermost pseudo skeleton pixel out of the respective pseudo skeleton pixels as the coordinate of the distal end portion of the finger. The finger area determining unit 208 outputs information of the area of the finger and information of the coordinate of the distal end portion of the finger to a finger operation determining unit 104.

Next, one example of the processing of the finger operation determining unit 104 is explained. The finger operation determining unit 104 determines the number of fingers based on the information of the area of the finger and the information of the coordinate of the finger. Alternatively, the finger operation determining unit 104 determines a combination of the fingers that are held up based on the information of the area of the finger and the information of the coordinate of the finger. The finger operation determining unit 104 determines the kind of operation with reference to a table that associates the number of the fingers or the combination of the fingers that are held up with the kind of the operation. The above-mentioned table is, for example, held by the finger operation determining unit 104. For example, in the finger operation determining unit 104, a known technique that is disclosed in Japanese Laid-open Patent Publication No. 2003-346162 or the like and determines the operation depending on a state of the finger recognized from the image may be used.

Figure 15:
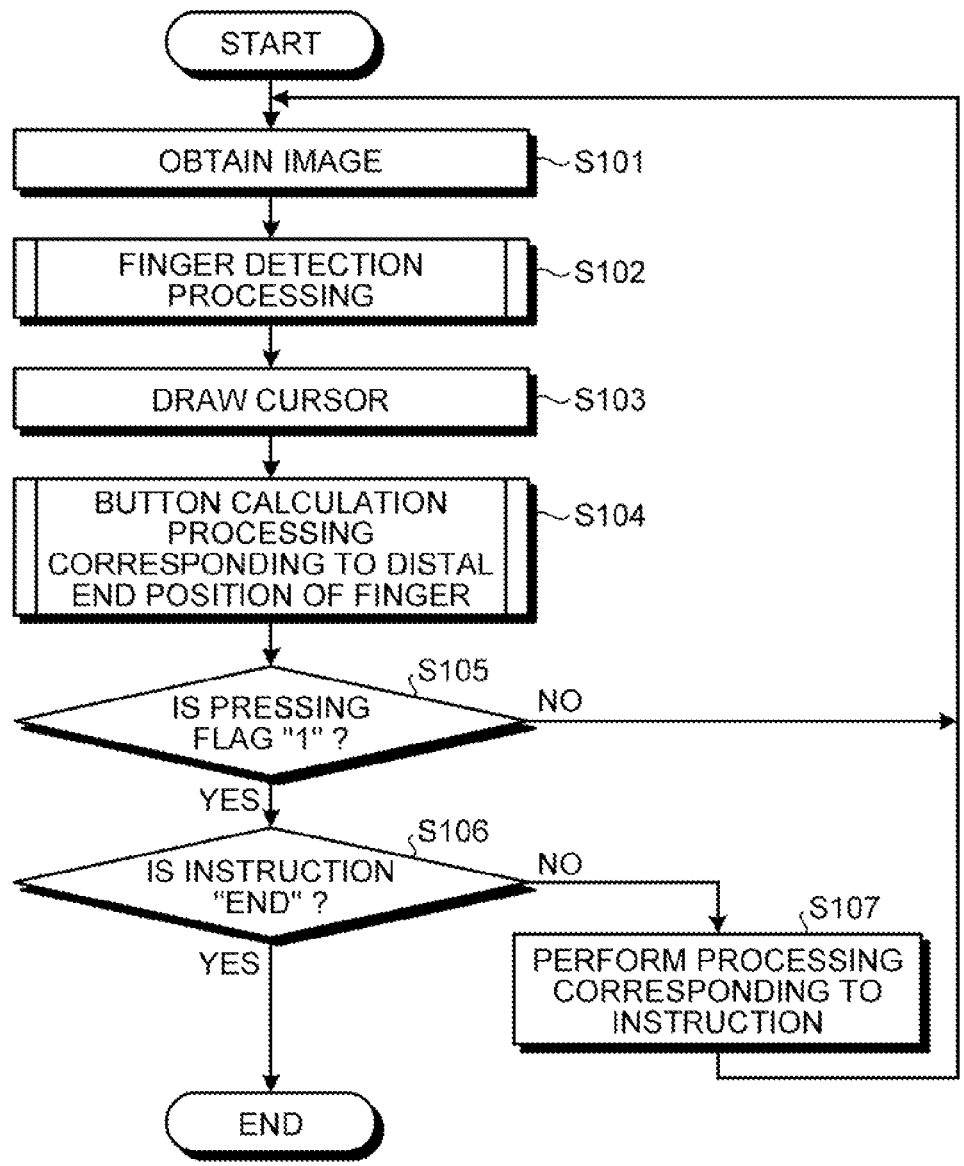
FIG. 15 is a flowchart illustrating the processing procedure of the image processing apparatus according to the present embodiment.

Next, the processing procedure of the image processing apparatus 100 according to the present embodiment is explained. FIG. 15 is a flowchart illustrating the processing procedure of the image processing apparatus according to the present embodiment. For example, the processing illustrated in FIG. 15 is performed when the image data is obtained from the camera 101a. The image processing apparatus 100 obtains the image data from the camera 101a (S101) and performs finger detection processing (S102).

The image processing apparatus 100 draws a cursor (S103), and performs button calculation processing corresponding to the distal end position of the finger (S104). The image processing apparatus 100 determines whether or not a pressing flag is one (1) (S105).

The image processing apparatus 100 advances, when the pressing flag is not one (1) ("No" at S105), the processing thereof to S101. When the pressing flag is one (1) ("Yes" at S105), the image processing apparatus 100 determines whether or not an instruction is "end" (S106).

The image processing apparatus 100 performs, when the instruction is not "end" ("No" at S106), processing corresponding to the instruction (S107), and advances the processing thereof to S101. When the instruction is "end" ("Yes" at S106), the image processing apparatus 100 terminates the processing thereof.

Figure 16A:
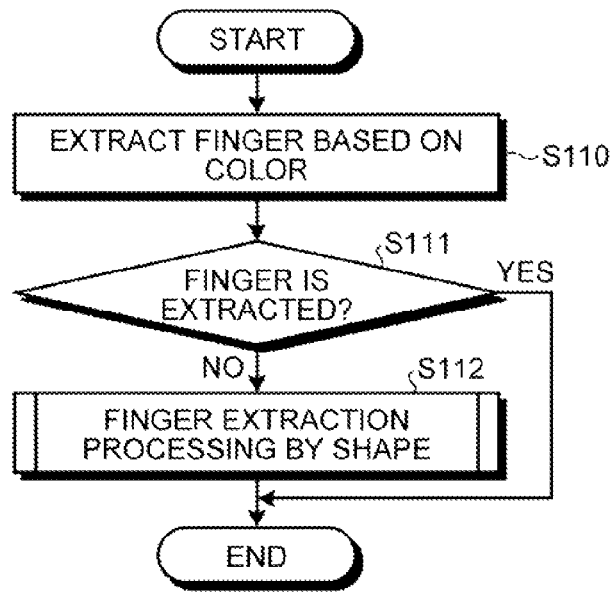
FIG. 16A is a flowchart illustrating the processing procedure of finger detection processing.

Next, the processing procedure of finger detection processing of S102 illustrated in FIG. 15 is explained. FIG. 16A is a flowchart illustrating the processing procedure of the finger detection processing. As illustrated in FIG. 16A, the image processing apparatus 100 extracts the finger based on the color (S110), and determines whether or not the finger is extracted (S111).

The image processing apparatus 100 terminates, when the finger is detected ("Yes" at S111), the finger detection processing. When the finger is not extracted ("No" at S111), the image processing apparatus 100 performs finger extraction processing based on the shape (S112).

Figure 16B:
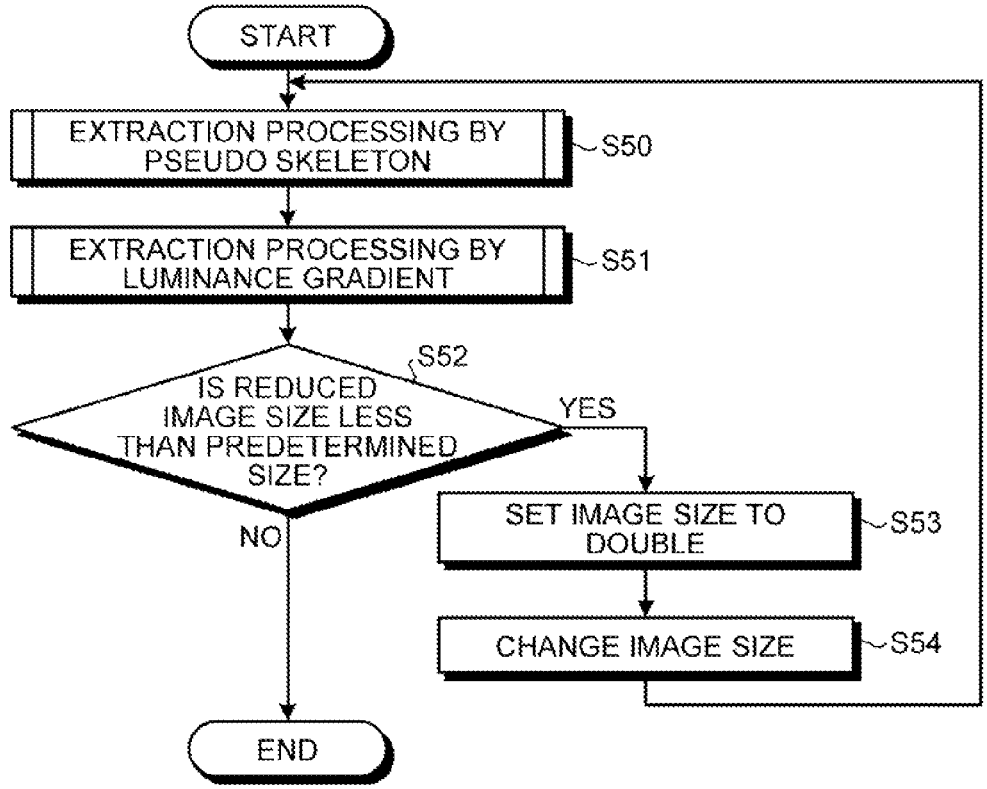
FIG. 16B is a flowchart illustrating the processing procedure of the finger detection processing based on a shape of the finger.

Next, the processing procedure of the finger extraction processing, which is performed based on the shape, of S112 illustrated in FIG. 16A is explained. FIG. 16B is a flowchart illustrating the processing procedure of the finger detection processing based on the shape. As illustrated in FIG. 16B, the image processing apparatus 100 performs the extraction processing by the pseudo skeleton (S50) and performs the extraction processing by the luminance gradient (S51).

The image processing apparatus 100 terminates, when the size of the reduced image is not less than a predetermined size ("No" at S52), the finger extraction processing based on the shape. When the size of the reduced image is less than the predetermined size ("Yes" at S52), the image processing apparatus 100 sets the image size to double (S53), changes the image size (S54), and advances the processing thereof to S50.

Next, the extraction processing by the pseudo skeleton, S50 illustrated in FIG. 16B, is explained. FIG. 17 is a flowchart illustrating the processing procedure of the extraction processing by the pseudo skeleton. As illustrated in FIG. 17, the image processing apparatus 100 performs edge extraction processing (S115) and, thereafter, performs pseudo distance conversion processing (S116).

The image processing apparatus 100 performs pseudo-skeleton extraction processing (S117), pseudo-skeleton clustering processing (S118), and pseudo-skeleton evaluation processing (S119) in this order.

Figure 18A:
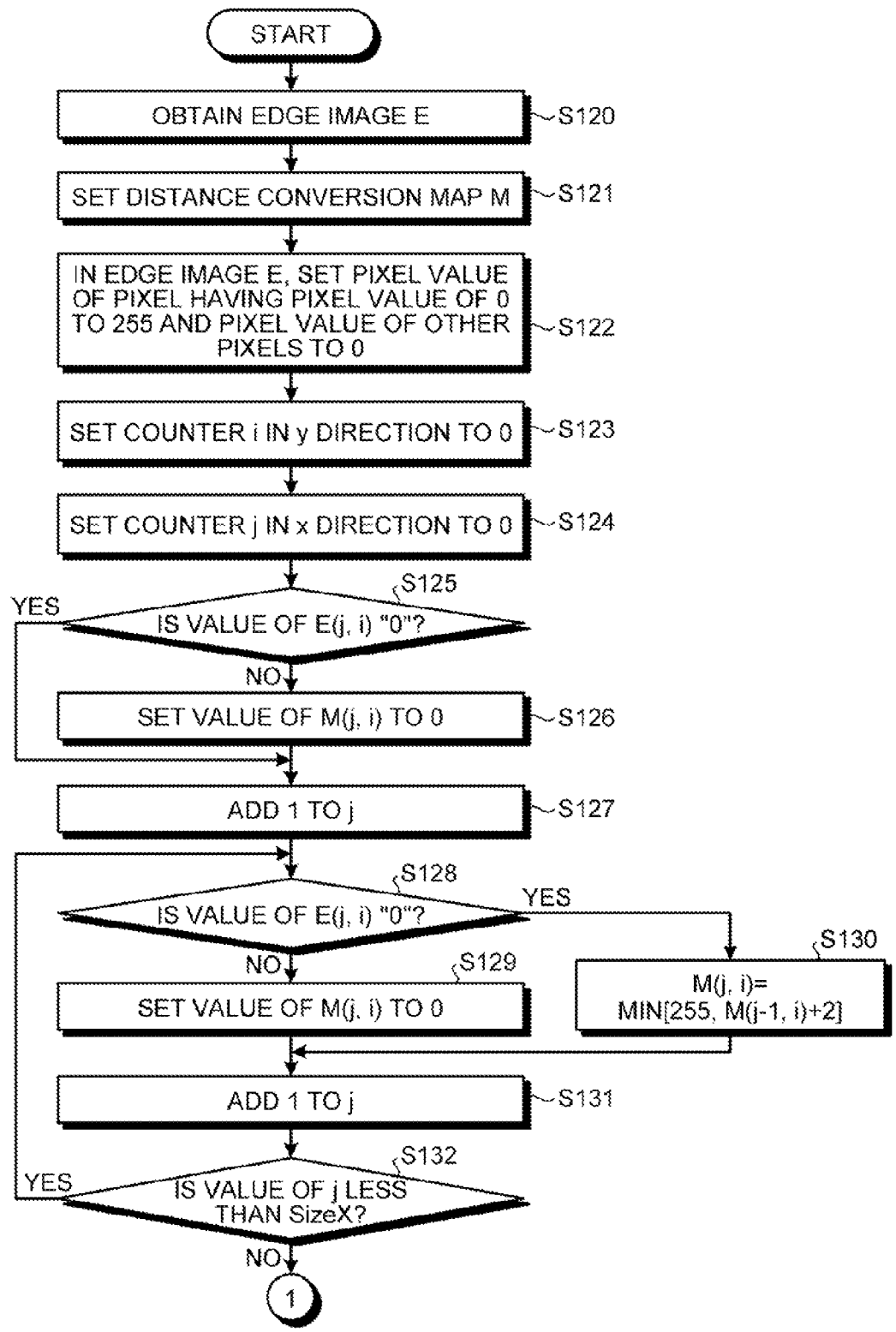
FIG. 18A is a first flowchart illustrating the processing procedure of the forward processing.
Figure 19:
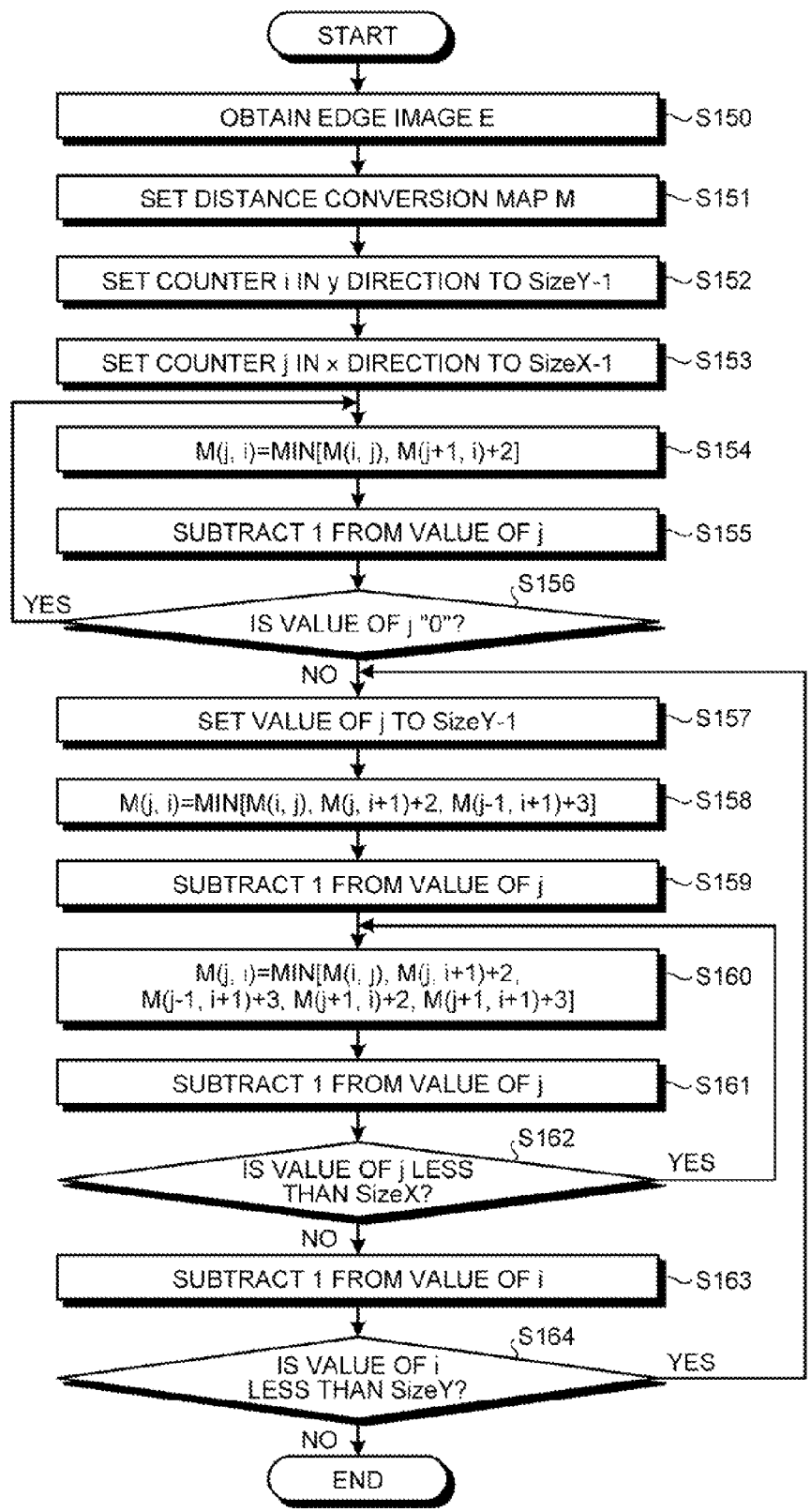
FIG. 19 is a flowchart illustrating the processing procedure of the backward processing.

Next, the processing procedure of the pseudo distance conversion processing of S116 illustrated in FIG. 17 is explained. The pseudo distance conversion processing sequentially executes the forward processing and the backward processing. FIG. 18A and FIG. 18B are flowcharts illustrating the processing procedure of the forward processing. FIG. 19 is a flowchart illustrating the processing procedure of the backward processing.

The processing procedure of the forward processing is explained. As illustrated in FIG. 18A, the image processing apparatus 100 obtains an edge image E (S120), and sets a distance conversion map M (S121). The image processing apparatus 100 sets, in the edge image E, each of the pixel values of the pixels each having a pixel value of zero (0) to 255, and sets each of the pixel values of the other pixels to zero (0) (S122).

The image processing apparatus 100 sets a counter in the y direction to zero (0) (S123) and sets a counter j in the x direction to zero (0) (S124). The image processing apparatus 100 advances, when the value of E(j, i) is zero (0) ("Yes" at S125), the processing thereof to S127. When the value of E(j, i) is not zero (0) ("No" at S125), the image processing apparatus 100 sets the value of M(j, i) to zero (0) (S126).

The image processing apparatus 100 adds one (1) to the value of j (S127), and determines whether or not the value of E(j, i) is zero (0) (S128). The image processing apparatus 100 sets, when the value of E(j, i) is not zero (0) ("No" at S128), the value of M(j, i) to zero (0) (S129), and advances the processing thereof to S131.

When the value of E(j, i) is zero (0) ("Yes" at S128), the image processing apparatus 100 sets the value of M(j, i) to MIN[255, M(j−1, i)+2] (S130), and adds one (1) to j (S131). The image processing apparatus 100 advances, when the value of j is less than SizeX ("Yes" at S132), the processing thereof to S128.

The image processing apparatus 100 advances, when the value of j is not less than SizeX ("No" at S132), the processing thereof to S133 illustrated in FIG. 18B. The image processing apparatus 100 adds one (1) to the value of (S133) and sets the value of j to zero (0) (S134). The image processing apparatus 100 sets, when the value of E(j, i) is not zero (0) ("No" at S135), the value of M(j, i) to zero (0) (S136) and advances the processing thereof to S138.

The image processing apparatus 100 sets, when the value of E(j, i) is zero (0) ("Yes" at S135), the value of M(j, i) to MIN[255, M(j−1, i)+2, M(j+1, i−1)+3] (S137). The image processing apparatus 100 adds one (1) to j (S138), and sets, when the value of E(j, i) is not zero (0) ("No" at S139), the value of M(j, i) to zero (0) (S140).

The image processing apparatus 100 sets, when the value of E(j, i) is zero (0) ("Yes" at S139), the value of M(j, i) to MIN[255, M(j, i−1)+2, M(j+1, i−1)+3, M(j−1, 1)+2, M(j−1, i−1)+3] (S141).

The image processing apparatus 100 adds one (1) to the value of j (S142), and advances, when the value of j is less than SizeX ("Yes" at S143), the processing thereof to S139. When the value of j is not less than SizeX ("No" at S143), the image processing apparatus 100 adds one (1) to the value of i (S144).

The image processing apparatus 100 advances, when the value of i is less than SizeY ("Yes" at S145), the processing thereof to S134. When the value of i is not less than SizeY ("No" at S145), the image processing apparatus 100 terminates the forward processing.

Next, the processing procedure of the backward processing is explained. As illustrated in FIG. 19, the image processing apparatus 100 obtains the edge image E (S150) and sets the distance conversion map M (S151).

The image processing apparatus 100 sets the counter i in the y direction to SizeY-1 (S152) and sets the counter j in the x direction to SizeX-1 (S153). The image processing apparatus 100 sets the value of M(j, i) to MIN[M(i, j), M(j+1, i)+2] (S154) and subtracts one (1) from the value of j (S155).

The image processing apparatus 100 advances, when the value of j is zero (0) ("Yes" at S156), the processing thereof to S154. When the value of j is not zero (0) ("No" at S156), the image processing apparatus 100 sets the value of j to SizeY-1 (S157).

The image processing apparatus 100 sets the value of M(j, i) to MIN[M(i, j), M(j, i+1)+2, M(j−1, i+1)+3] (S158) and subtracts one (1) from the value of j (S159).

The image processing apparatus 100 sets the value of M(j, i) to MIN[M(i, j), M(j, i+1)+2, M(j−1, i+1)+3, M(j+1,i)+2, M(j+1, i+1)+3 ](S160).

The image processing apparatus 100 subtracts 1 from the value of j (S161) and advances, when the value of j is less than SizeX ("Yes" at S162), the processing thereof to S160. When the value of j is not less than SizeX ("No" at S162), the image processing apparatus 100 subtracts one (1) from the value of i (S163).

The image processing apparatus 100 advances, when the value of i is less than SizeY ("Yes" at S164), the processing thereof to S157. When the value of i is not less than SizeY ("No" at S164), the image processing apparatus 100 terminates the backward processing.

Next, the processing procedure of the pseudo-skeleton extraction processing of S117 illustrated in FIG. 17 is explained. FIG. 20 is a flowchart illustrating the processing procedure of the pseudo-skeleton extraction processing. As illustrated in FIG. 20, the image processing apparatus 100 obtains an image size (SizeX, SizeY) (S170) and obtains the distance conversion map M (S171).

The image processing apparatus 100 obtains skeleton coordinates Px, Py (S172) and obtains the number of skeleton coordinates NumP (S173). The image processing apparatus 100 sets the counter i in the y direction to zero (0) (S174) and sets the counter j in the x direction to zero (0) (S175).

The image processing apparatus 100 determines whether or not the pixel to be focused has the highest map value in the vicinity of the area in which the pixels are arranged in a three-by-three-matrix pattern (S176). The image processing apparatus 100 advances, when the pixel to be focused does not have the highest map value in the vicinity of the area in which the pixels are arranged in a three-by-three-matrix pattern ("No" at S176), the processing thereof to S179.

When the pixel to be focused has the highest map value in the vicinity of the area in which the pixels are arranged in a three-by-three-matrix pattern ("Yes" at S176), the image processing apparatus 100 determines whether or not the map value is less than Th(max) or whether or not the map value is greater than Th(min) (S177).

The image processing apparatus 100 advances, when the map value is not less than Th(max) or the map value is not greater than Th(min) ("No" at S177), the processing thereof to S179. When the map value is less than Th(max) or the map value is greater than Th(min) ("Yes" at S177), the image processing apparatus 100 sets the value of Px(NumP) to j and sets the value of Py(NumP) to i (S178).

The image processing apparatus 100 adds one (1) to the value of NumP (S179), adds one (1) to the value of j (S180), and determines whether or not the value of j is less than SizeX (S181).

The image processing apparatus 100 advances, when the value of j is less than SizeX ("Yes" at S181), the processing thereof to S176. When the value of j is not less than SizeY ("No" at S181), the image processing apparatus 100 adds one (1) to the value of i (S182). The image processing apparatus 100 advances, when the value of is less than SizeY ("Yes" at S183), the processing thereof to S175. When the value of i is not less than SizeY ("No" at S183), the image processing apparatus 100 terminates the pseudo-skeleton extraction processing.

Figure 21B:
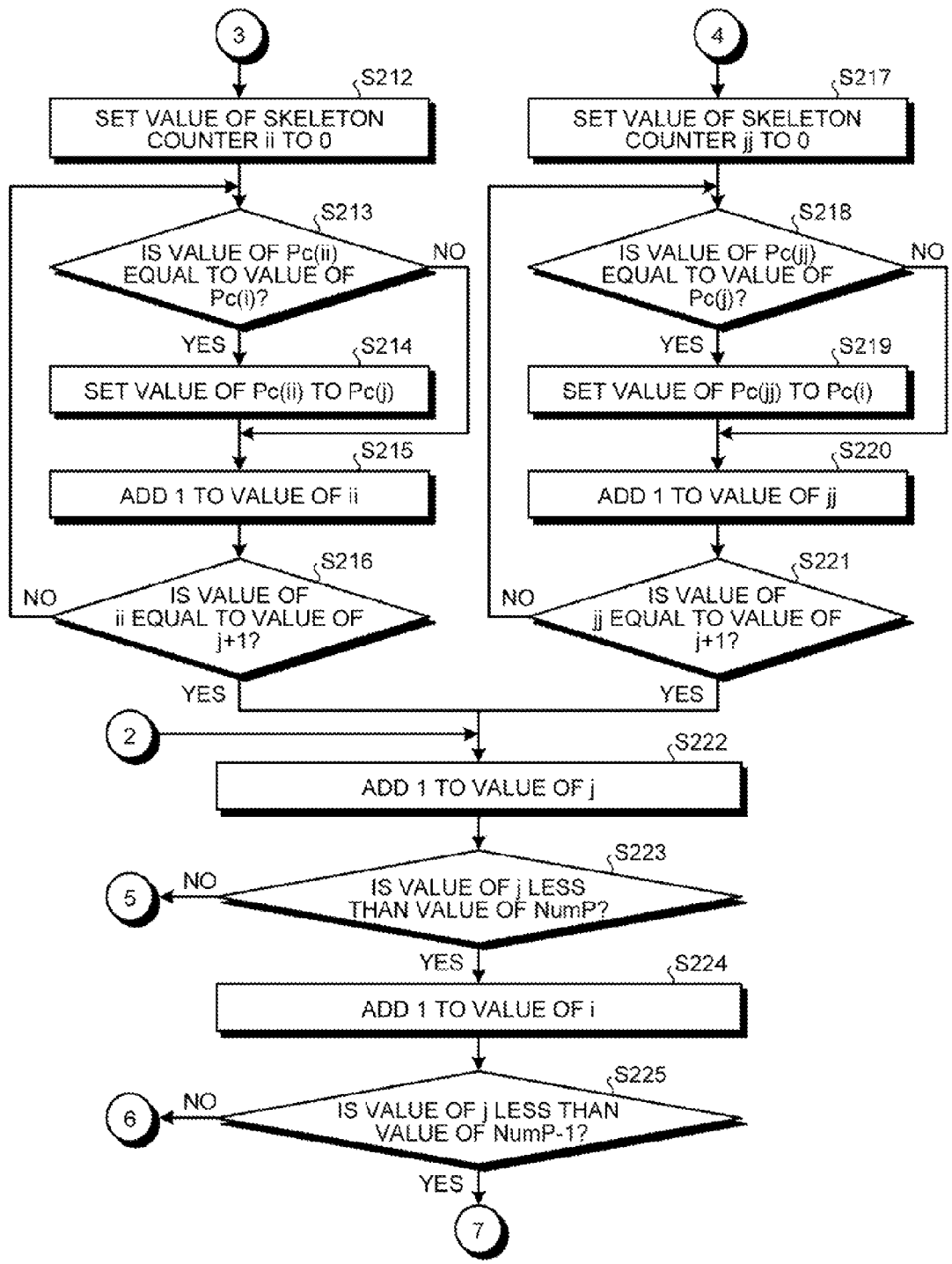
FIG. 21B is a second flowchart illustrating the processing procedure of the pseudo-skeleton clustering processing.
Figure 21C:
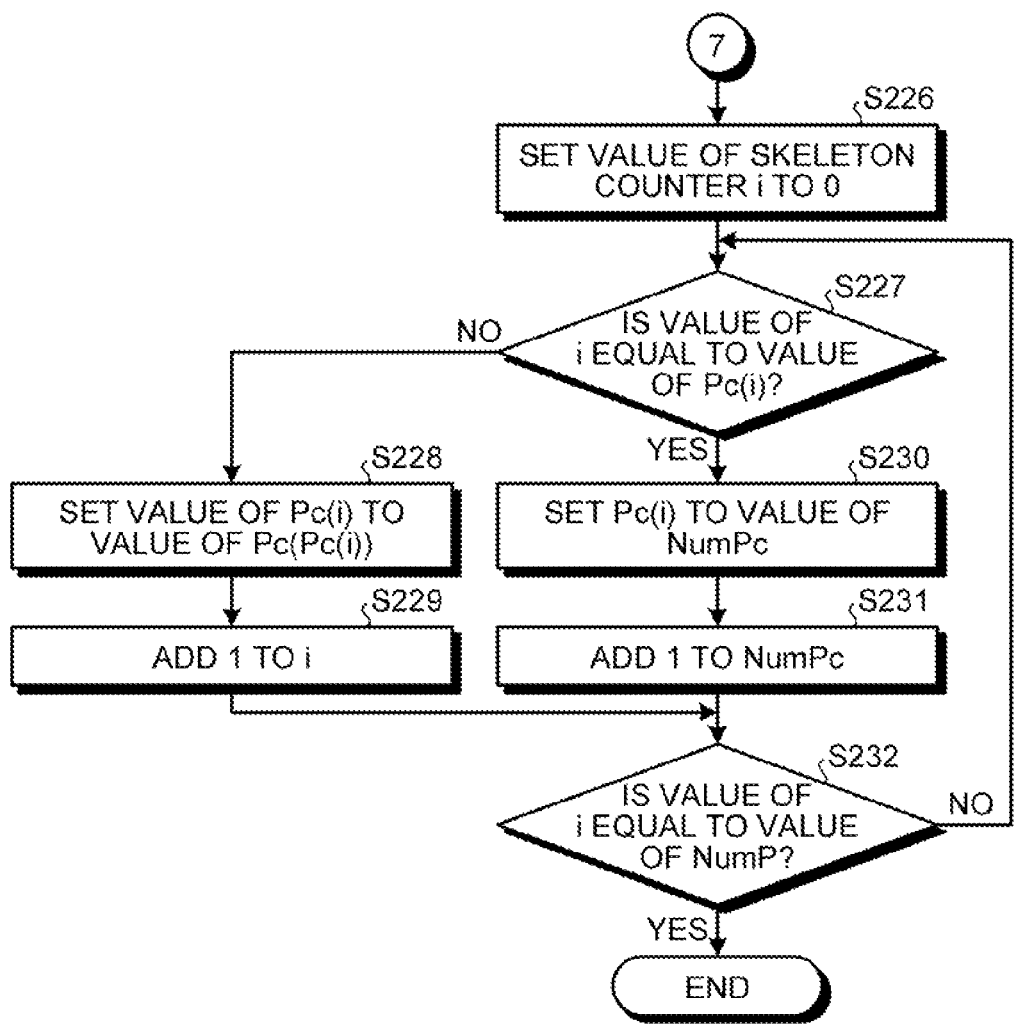
FIG. 21C is a third flowchart illustrating the processing procedure of the pseudo-skeleton clustering processing.

Next, pseudo-skeleton clustering processing of S118 illustrated in FIG. 17 is explained. FIG. 21A to FIG. 21C are flowcharts illustrating the processing procedure of the pseudo-skeleton clustering processing. As illustrated in FIG. 21A, the image processing apparatus 100 obtains an image size (SizeX, SizeY) (S201), and obtains a skeleton coordinate arrangement (Px, Py) (S202).

The image processing apparatus 100 sets a value of the number of skeleton coordinates NumP to zero (0) (S203), and obtains a skeleton class Pc (S204). The image processing apparatus 100 sets a value of the number of the skeleton classes NumPc to zero (0) (S205). The image processing apparatus 100 initializes the skeleton class (S206).

The image processing apparatus 100 sets a value of a skeleton counter i to zero (0) (S207), and sets a value of a skeleton counter j to i+1 (S208). The image processing apparatus 100 sets a value of Dij to sqrt((Px(i)−Px(j))^2+(Py(i)−Py(j))^2) (S209).

The image processing apparatus 100 advances, when the value of Dij is not less than Min(val(i), val(j)) ("No" at S210), the processing thereof to S222 illustrated in FIG. 21B. When the value of Dij is less than Min(val(i), val(j)) ("Yes" at S210), the image processing apparatus 100 determines whether or not a value of Pc(i) is less than a value of Pc(j) (S211).

The image processing apparatus 100 advances, when the value of Pc(i) is not less than the value of Pc(j) ("No" at S211), the processing thereof to S212 illustrated in FIG. 21B. When the value of Pc(i) is less than the value of Pc(j) ("Yes" at S211), the image processing apparatus 100 advances the processing thereof to S217 illustrated in FIG. 21B.

Hereinafter, FIG. 21B is explained. The image processing apparatus 100 sets a value of a skeleton counter ii to zero (0) (S212) and advances, when a value of Pc(ii) and the value of Pc(i) are not equal to each other ("No" at S213), the processing thereof to S215. When the value of Pc(ii) and the value of Pc(i) are equal to each other ("Yes" at S213), the image processing apparatus 100 sets the value of Pc(ii) to Pc(j) (S214).

The image processing apparatus 100 adds one (1) to a value of ii (S215) and advances, when the value of ii and a value of j+1 are not equal to each other ("No" at S216), the processing thereof to S213. When the value of ii and the value of j+1 are equal to each other ("Yes" at S216), the image processing apparatus 100 advances the processing thereof to S222.

Here, the image processing apparatus 100 sets a value of a skeleton counter jj to zero (0) (S217) and advances, when a value of Pc(jj) and the value of Pc(j) are not equal to each other ("No" at S218), the processing thereof to S220. When the value of Pc(jj) and the value of Pc(j) are equal to each other ("Yes" at S218), the image processing apparatus 100 sets the value of Pc(jj) to Pc(i) (S219).

The image processing apparatus 100 adds one (1) to the value of jj (S220) and advances, when the value of jj and the value of j+1 are not equal to each other ("No" at S221), the processing thereof to S218. When the value of jj and the value of j+1 are equal to each other ("Yes" at S221), the image processing apparatus 100 advances the processing thereof to S222.

The image processing apparatus 100 adds one (1) to the value of j (S222) and advances, when the value of j is not less than the value of NumP ("No" at S223), the processing thereof to S208 illustrated in FIG. 21A. When the value of j is less than the value of NumP ("Yes" at S223), the image processing apparatus 100 adds one (1) to the value of i (S224) and determines whether or not the value of j is less than a value of NumP−1 (S225).

The image processing apparatus 100 advances, when the value of j is not less than the value of NumP−1 ("No" at S225), the processing thereof to S209 illustrated in FIG. 21A. When the value of j is less than the value of NumP−1 ("Yes" at S225), the image processing apparatus 100 advances the processing thereof to S226 illustrated in FIG. 21C.

Hereinafter, FIG. 21C is explained. The image processing apparatus 100 sets the value of the skeleton counter i to zero (0) (S226) and sets, when the value of i and the value of Pc(i) are not equal to each other ("No" at S227), the value of Pc(i) to Pc(Pc(i)) (S228). The image processing apparatus 100 adds one (1) to i (S229) and advances the processing thereof to S232.

When the value of i and the value of Pc(i) are equal to each other ("Yes" at S227), the image processing apparatus 100 sets Pc(i) to the value of NumPc (S230). The image processing apparatus 100 adds one (1) to NumPc (S231).

The image processing apparatus 100 advances, when the value of i and the value of NumPc are not equal to each other ("No" at S232), the processing thereof to S227. When the value of i and the value of NumP are equal to each other ("Yes" at S232), the image processing apparatus 100 terminates the pseudo-skeleton clustering processing.

Figure 22:
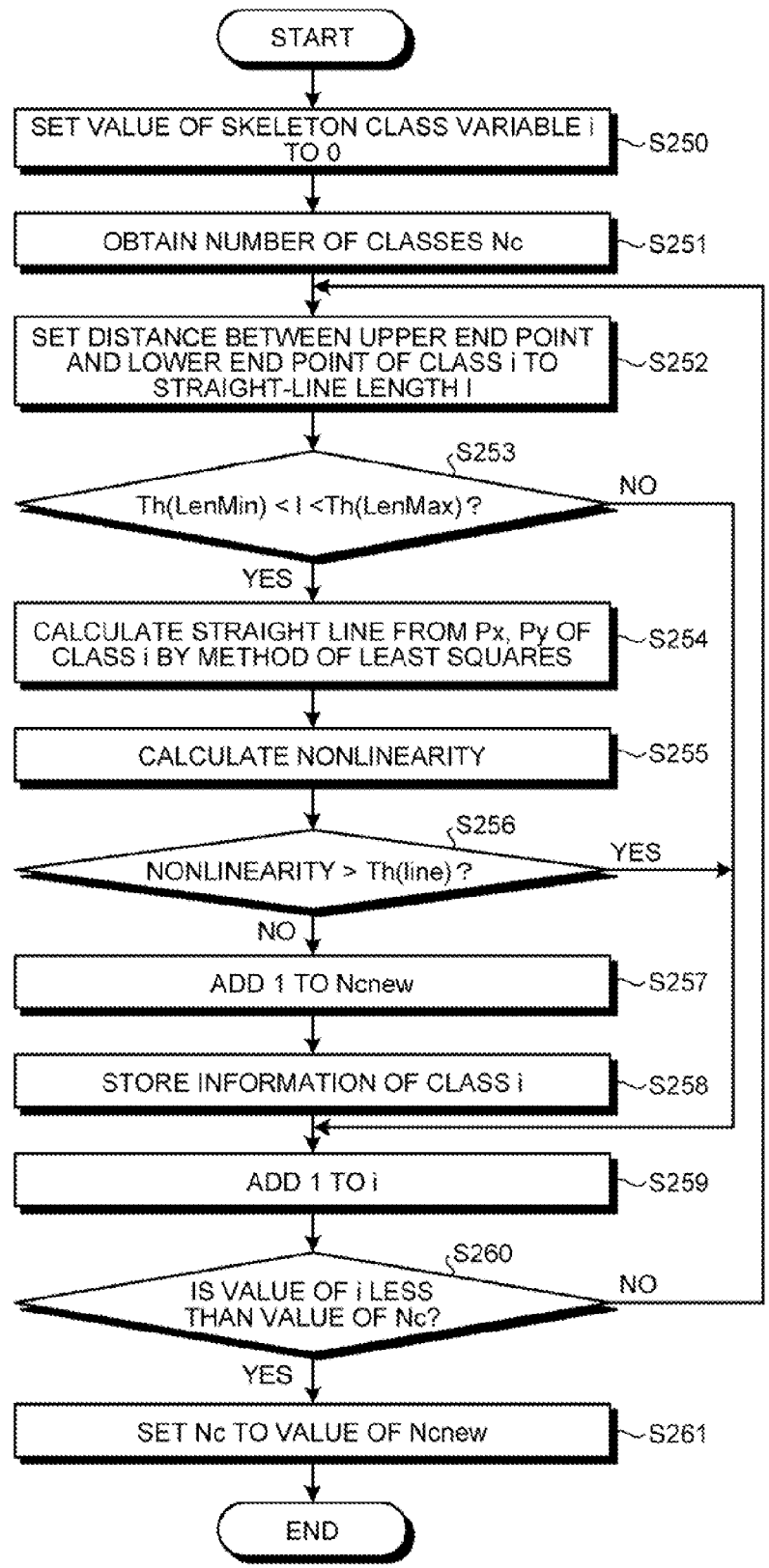
FIG. 22 is a flowchart illustrating the processing procedure of pseudo-skeleton evaluation processing.

Next, the pseudo skeleton evaluation processing of S119 illustrated in FIG. 17 is explained. FIG. 22 is a flowchart illustrating the processing procedure of the pseudo-skeleton evaluation processing. As illustrated in FIG. 22, the image processing apparatus 100 sets a value of a skeleton-class variable i to zero (0) (S250) and obtains the number of the classes Nc (S251).

The image processing apparatus 100 sets a distance between an upper end point and a lower end point of the class i to a straight-line length 1 (S252) and advances, when the relationship of Th(LenMin)<l<Th(LenMax) is not satisfied ("No" at S253), the processing thereof to S259.

The image processing apparatus 100 calculates, when the relationship of Th(LenMin)<l<Th(LenMax) is satisfied ("Yes" at S253), the straight line from Px and Py of the class i by using the method of least squares (S254). The image processing apparatus 100 calculates nonlinearity (S255) and advances, when the nonlinearity is larger than Th(line) ("Yes" at S256), the processing thereof to S259.

When the nonlinearity is not larger than Th(line) ("No" at S256), the image processing apparatus 100 adds one (1) to Ncnew (S257). The initial value of Ncnew is set to zero (0). The image processing apparatus 100 stores information of the class i (S258) and adds one (1) to i (S259).

The image processing apparatus 100 advances, when the value of i is not less than the value of Nc ("No" at S260), the processing thereof to S252. When the value of i is less than the value of Nc ("Yes" at S260), the image processing apparatus 100 sets Nc to the value of Ncnew (S261) and terminates the pseudo-skeleton evaluation processing.

Figure 23A:
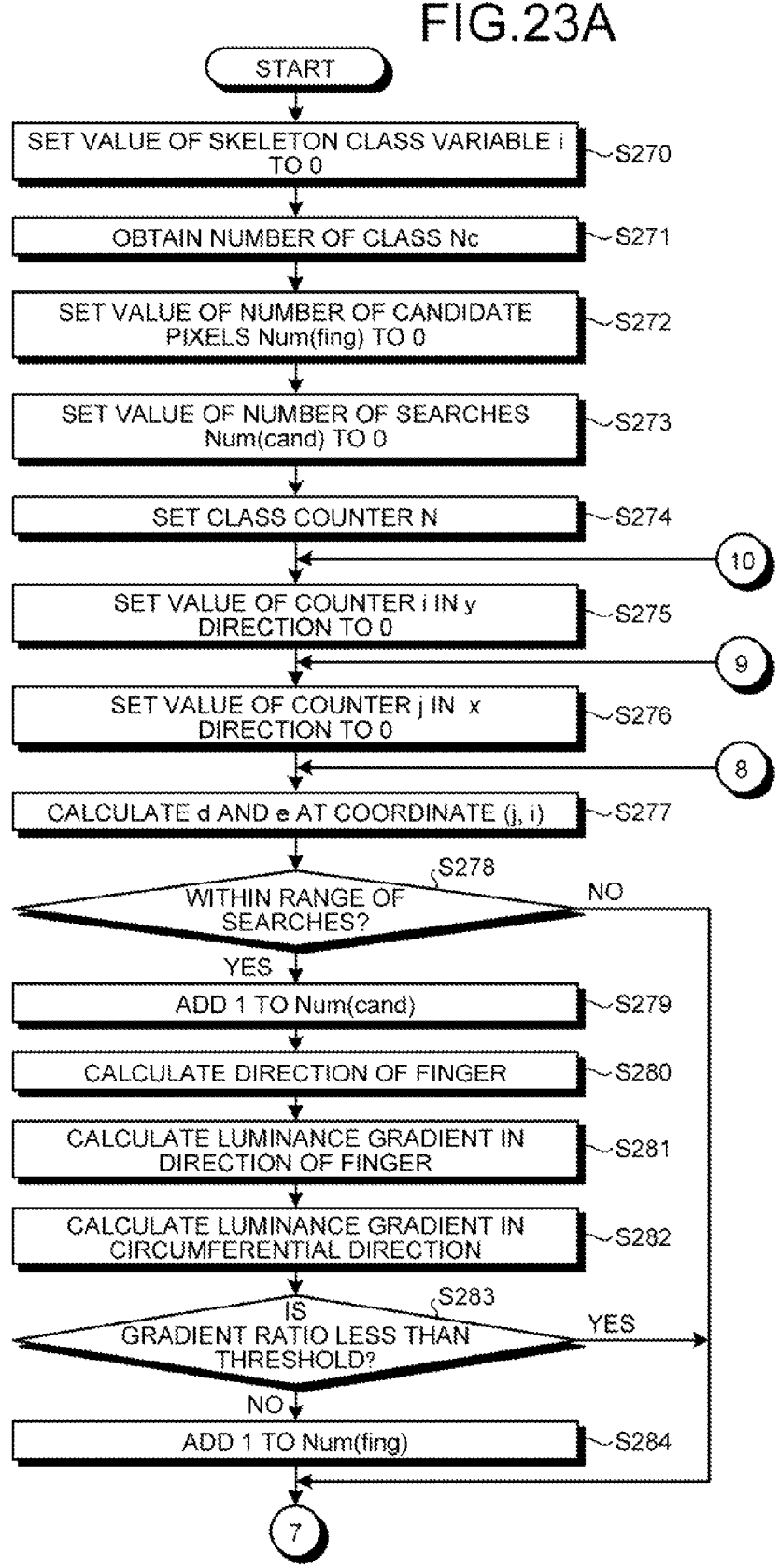
FIG. 23A is a first flowchart illustrating the processing procedure of extraction processing by the luminance gradient.
Figure 23B:
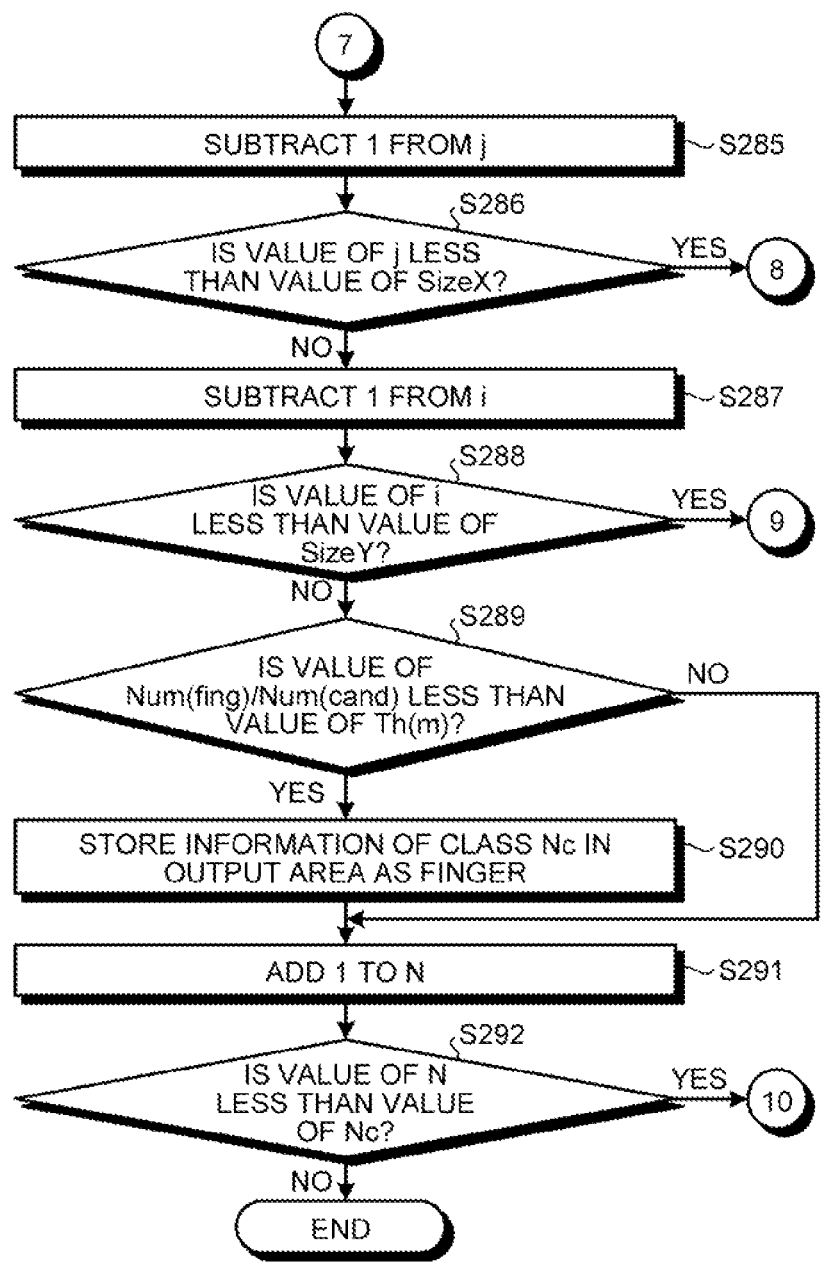
FIG. 23B is a second flowchart illustrating the processing procedure of the luminance gradient.

Next, the processing procedure of the extraction processing by the luminance gradient, S51 illustrated in FIG. 16B, is explained. FIG. 23A and FIG. 23B are flowcharts illustrating the processing procedure of the extraction processing by the luminance gradient. As illustrated in FIG. 23A, the image processing apparatus 100 sets the value of the skeleton-class variable i to zero (0) (S270), obtains the number of the class Nc (S271), and sets the number of candidate pixels Num(fing) to zero (0) (S272).

The image processing apparatus 100 sets the number of searches Num(cand) to zero (0) (S273) and sets the class counter N (S274). The image processing apparatus 100 sets the value of the counter i in the y direction to zero (0) (S275) and sets the value of the counter j in the x direction to zero (0) (S276).

The image processing apparatus 100 calculates d and e at the coordinate (j, i) (S277) and advances, when d and e are not within the range of searches ("No" at S278), the processing thereof to S285 illustrated in FIG. 23B.

When d and e are within the range of searches ("Yes" at S278), the image processing apparatus 100 adds one (1) to Num(cand) (S279) and calculates the direction of the finger (S280). The image processing apparatus 100 calculates the luminance gradient in the direction of the finger (S281) and calculates the luminance gradient in the circumferential direction (S282).

The image processing apparatus 100 advances, when a gradient ratio (Gf/Gn) is less than a threshold ("Yes" at S283), the processing thereof to S285 illustrated in FIG. 23B. When the gradient ratio (Gf/Gn) is not less than the threshold ("No" at S283), the image processing apparatus 100 adds one (1) to Num(fing) (S284) and advances the processing thereof to S285 illustrated in FIG. 23B.

Hereinafter, FIG. 23B is explained. The image processing apparatus 100 subtracts one (1) from j (S285) and advances, when the value of j is less than the value of SizeX ("Yes" at S286), the processing thereof to S277 illustrated in FIG. 23A.

The image processing apparatus 100 subtracts, when the value of j is not less than the value of SizeX ("No" at S286), one (1) from i (S287) and advances, when the value of i is less than the value of SizeY ("Yes" at S288), the processing thereof to S276 illustrated in FIG. 23A.

The image processing apparatus 100 advances, when a value of Num(fing)/Num(cand) is not less than the value of Th(m) ("No" at S289), the processing thereof to S291. When the value of Num(fing)/Num(cand) is less than the value of Th(m) ("Yes" at S289), the image processing apparatus 100 stores the information of the class Nc in an output area as the finger (S290).

The image processing apparatus 100 adds one (1) to N (S291) and advances, when a value of N is less than a value of Nc ("Yes" at S292), the processing thereof to S275. When the value of N is not less than the value of Nc ("No" at S292), the image processing apparatus 100 terminates the extraction processing by the luminance gradient.

Next, advantageous effects of the image processing apparatus 100 according to the present embodiment are explained. The image processing apparatus 100 extracts the edges from the image to be recognized and obtains the pseudo skeleton in the area surrounded by the edges. Furthermore, the image processing apparatus 100 makes use of the luminance gradients in the long side direction and in the short side direction of the area surrounded by the pseudo skeletons and the edges to determine whether or not the area surrounded by the pseudo skeletons and the edges is the area of the finger. Therefore, according to the image processing apparatus 100, it is possible to determine the area of the finger irrespective of background colors.

Furthermore, the image processing apparatus 100 determines the kind of the operation based on button control information associating an area on the screen of the display unit 101b with the kind of the operation corresponding to the area on the screen, and the coordinates of the area of the finger. Therefore, the image processing apparatus 100 enables operation by the movement of the finger even when the hand and the face of the user are included in the image data.

Furthermore, the image processing apparatus 100 extracts, when the pseudo skeleton is extracted, the pseudo skeleton whose distance from the corresponding edge is less than a predetermined threshold. Therefore, the image processing apparatus 100 is capable of eliminating effectively the pseudo skeleton that is clearly different from the pseudo skeleton corresponding to the finger.

Here, the above-mentioned processing of the image processing apparatus 100 is one example. Hereinafter, the other processes of the image processing apparatus 100 are explained.

The second finger detecting unit 103 illustrated in FIG. 1 is explained by taking the case that the image size changing unit 201 changes the size of the image data to detect the area of the finger from the image data of the respective sizes as an example. However, the processing of the second finger detecting unit 103 is not limited to this example. For example, each threshold can be changed instead of changing the size of the image data for detecting the area of the finger from the image data of the respective sizes.

For example, in the second finger detecting unit 103, instead of reducing lateral and longitudinal dimensions of the image into ½, values of the threshold Th(max) and the threshold Th(min) are set smaller than Th(Len max) and, at the same time, the value of Th(Len min) is doubled. Furthermore, the second finger detecting unit 103 doubles the value of Th(line). In other words, in the second finger detecting unit 103, when the lateral and longitudinal dimensions of the image are reduced into 1/n, the values of the threshold Th(max) and the threshold Th(min) are set smaller than Th(Len max) and, at the same time, the value of Th(Len min) is n-folded. Furthermore, the second finger detecting unit 103 $n^2$-folds the value of Th(line). In this manner, the second finger detecting unit 103 is capable of detecting the area of the finger corresponding to each size of the image data without changing the image size.

Furthermore, the pseudo skeleton extracting unit 204 may, when the pseudo skeleton is extracted, make use of the luminance gradient in addition to the above-mentioned processing. For example, the pseudo skeleton extracting unit 204 may obtain the luminance gradients in the axis-of-ordinate direction and in the axis-of-abscissa direction, and extract the pseudo skeleton whose luminance gradients in the axis-of-ordinate direction and in the axis-of-abscissa direction are less than a predetermined thresholds. Since the finger has a columnar shape, the luminance does not change in the axis-of-ordinate direction or in the axis-of-abscissa direction. In contrast, since a nose has a conical shape, the luminance changes in the axis-of-ordinate direction and in the axis-of-abscissa direction and hence, it is possible to make use of the changes in the luminance gradients. When the pseudo skeleton extracting unit 204 performs such processing, the number of the pseudo skeletons to be extracted is reduced to reduce processing load thus improving accuracy of detecting the finger.

Here, the image processing apparatus 100 can also be realized by an information processing device, such as the existing personal computer (PC) or the like, equipped with the respective functions of the image processing apparatus 100.

FIG. 24 is a diagram illustrating a hardware configuration of a computer that constitutes the image processing apparatus according to the embodiment. As illustrated in FIG. 24, a computer 300 has a central processing unit (CPU) 301 that executes various arithmetic processes, an input device 302 that receives the input of data from a user, and a display 303. Furthermore, the computer 300 has a reader 304 that reads a program or the like from a storage medium, an interface device 305 that performs communication with the other devices via a network, and a camera 306 that takes an image. Furthermore, the computer 300 has a random access memory (RAM) 307 that stores various kinds of information temporarily and a hard disk drive 308. The respective devices 301 to 308 are connected to a bus 309.

The hard disk drive 308 stores a central-portion extraction program 308a, a classification program 308b, and a determination program 308c.

The CPU 301 reads the respective programs 308a to 308c stored in the hard disk drive 308 and develops in the RAM 307. Due to such a constitution, the central-portion extraction program 308a functions as a central-portion extraction process 307a. The classification program 308b functions as a classification process 307b. The determination program 308c functions as a determination process 307c.

For example, the central-portion extraction process 307a corresponds to the edge extracting unit 202, the pseudo distance converting unit 203, and the pseudo skeleton extracting unit 204. The classification process 307b corresponds to the clustering unit 205. The determination process 307c corresponds to the luminance gradient extracting unit 207, and the finger area determining unit 208.

Here, the above-mentioned programs 308a to 308c can be stored in another storage device. For example, the programs 308a to 308c may be stored in a storage medium such as a CD-ROM so that the computer 300 reads each of the programs 308a to 308c from the storage medium to execute that. Furthermore, each of the programs 308a to 308c may be stored in storage devices connected to a public line, the Internet, a local area network (LAN), a wide area network (WAN), or the like. In this case, the computer 300 may read each of the programs 308a to 308c from these storage devices to execute that.

The image processing apparatus disclosed herein has an advantage in that it can determine the area of the fingers of a hand.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing apparatus comprising:
a central-portion extracting unit that extracts edges from an image area and extracts a plurality of central portions of areas each of which is sandwiched between the edges;
a classifying unit that groups the central portions by classifying adjacent central portions that have no edge therebetween into a single group; and
a determining unit that determines an area of finger, the area of finger being surrounded by the central portions classified into a group by the classifying unit and peripheral edges of the central portion, the area of finger being an area where a ratio of a luminance gradient in a short side direction to a luminance gradient in a long side direction is within a predetermined threshold.

2. The image processing apparatus according to claim 1, wherein
the determining unit determines the area of finger in a rectangular area, the rectangular area being calculated based on the central portions classified into a group by the classifying unit and a pseudo skeleton obtained from peripheral edges of the central portions and values of distances from an edge of each point of the pseudo skeleton.

3. The image processing apparatus according to claim 1, wherein
the central-portion extracting unit extracts a central portion whose distance from the corresponding edge is less than a predetermined threshold out of the central portions of the areas each of which is sandwiched between the edges.

4. The image processing apparatus according to claim 1, wherein
the central-portion extracting unit obtains luminance gradients in a longitudinal direction and in a lateral direction with respect to a central portion of an area sandwiched between the edges, and extracts the central portion whose luminance gradients in the longitudinal direction and in the lateral direction are less than a predetermined threshold.

5. An image processing method executed by a computer, the method comprising:
extracting edges from an image area and extracting a plurality of central portions of areas each of which is sandwiched between the edges;
grouping the central portions by classifying adjacent central portions that have no edge therebetween into a single group; and determining an area of finger, the area of finger being surrounded by the central portions classified into a group and peripheral edges of the central portion, the area of finger being an area where a ratio of a luminance gradient in a short side direction to a luminance gradient in a long side direction is within a predetermined threshold.

6. The image processing method according to claim 5, wherein
the determining determines the area of finger in a rectangular area, the rectangular area being calculated based on the central portions classified into a group and a pseudo skeleton obtained from peripheral edges of the central portions and values of distances from an edge of each point of the pseudo skeleton.

7. The image processing method according to claim 5, wherein
the extracting extracts a central portion whose distance from the corresponding edge is less than a predetermined threshold out of the central portions of the areas each of which is sandwiched between the edges.

8. The image processing method according to claim 5, wherein
the extracting obtains luminance gradients in a longitudinal direction and in a lateral direction with respect to a central portion of an area sandwiched between the edges, and extracts the central portion whose luminance gradients in the longitudinal direction and in the lateral direction are less than a predetermined threshold.

9. A non-transitory computer readable storage medium having stored therein an image processing program for causing a computer to execute a process comprising:
extracting edges from an image area and extracting a plurality of central portions of areas each of which is sandwiched between the edges;
grouping the central portions by classifying adjacent central portions that have no edge therebetween into a single group; and
determining an area of finger, the area of finger being surrounded by the central portions classified into a group and peripheral edges of the central portion, the area of finger being an area where a ratio of a luminance gradient in a short side direction to a luminance gradient in a long side direction is within a predetermined threshold.

10. The non-transitory computer-readable storage medium according to claim 9, wherein
the determining determines the area of finger in a rectangular area, the rectangular area being calculated based on the central portions classified into a group and a pseudo skeleton obtained from peripheral edges of the central portions and values of distances from an edge of each point of the pseudo skeleton.

11. The non-transitory computer-readable storage medium according to claim 9, wherein
the extracting extracts a central portion whose distance from the corresponding edge is less than a predetermined threshold out of the central portions of the areas each of which is sandwiched between the edges.

12. The non-transitory computer-readable storage medium according to claim 9, wherein
the extracting obtains luminance gradients in a longitudinal direction and in a lateral direction with respect to a central portion of an area sandwiched between the edges, and extracts the central portion whose luminance gradients in the longitudinal direction and in the lateral direction are less than a predetermined threshold.

13. An image processing apparatus comprising:
a processor; and
a memory, wherein the processor executes:
extracting edges from an image area and extracting a plurality of central portions of areas each of which is sandwiched between the edges;
grouping the central portions by classifying adjacent central portions that have no edge therebetween into a single group; and
determining an area of finger, the area of finger being surrounded by the central portions classified into a group and peripheral edges of the central portion, the area of finger being an area where a ratio of a luminance gradient in a short side direction to a luminance gradient in a long side direction is within a predetermined threshold.

* * * * *